(12) United States Patent
Barrow et al.

(10) Patent No.: US 7,802,591 B2
(45) Date of Patent: Sep. 28, 2010

(54) MICROFLUIDIC DEVICE AND METHODS FOR CONSTRUCTION AND APPLICATION

(75) Inventors: David Anthony Barrow, Cardiff (GB); Nicola Harries, Cardiff (GB); Tyrone Gwyn Jones, Mid Glamorgan (GB); Kostas Bouris, Cardiff (GB)

(73) Assignee: Q Chip Limited, Cardiff (GB)

( * ) Notice: Subject to any disclaimer, the term of this patent is extended or adjusted under 35 U.S.C. 154(b) by 774 days.

(21) Appl. No.: 10/534,592

(22) PCT Filed: Nov. 14, 2003

(86) PCT No.: PCT/GB03/04976

§ 371 (c)(1),
(2), (4) Date: Oct. 5, 2005

(87) PCT Pub. No.: WO2004/043598

PCT Pub. Date: May 27, 2004

(65) Prior Publication Data

US 2006/0108012 A1 May 25, 2006

(30) Foreign Application Priority Data

Nov. 14, 2002 (GB) ................. 0226691.4

(51) Int. Cl.
*F15B 21/04* (2006.01)
*F15C 1/06* (2006.01)
*F16L 41/02* (2006.01)
(52) U.S. Cl. .............. 137/806; 137/833; 137/561 R
(58) Field of Classification Search ........... 137/806, 137/833, 561 A, 561 R; 204/450; 436/53; 285/131.1
See application file for complete search history.

(56) References Cited

U.S. PATENT DOCUMENTS

| | | | | |
|---|---|---|---|---|
| 3,537,889 A | * | 11/1970 | Jurgensen et al. | 438/106 |
| 5,376,252 A | * | 12/1994 | Ekstrom et al. | 204/603 |
| 5,716,852 A | | 2/1998 | Yager et al. | 436/172 |
| 5,932,100 A | | 8/1999 | Yager et al. | 210/634 |
| 5,948,684 A | | 9/1999 | Weigl et al. | 436/52 |
| 5,957,579 A | * | 9/1999 | Kopf-Sill et al. | 366/340 |
| 5,972,710 A | | 10/1999 | Weigl et al. | 436/34 |
| 6,027,146 A | * | 2/2000 | Kurimoto | 285/131.1 |

(Continued)

FOREIGN PATENT DOCUMENTS

GB 2359765 A * 9/2001

(Continued)

OTHER PUBLICATIONS

John Oakey, et al., Laminar-Flow-Based Separations at the Microscale, Biotechnol. Prog. 2002, 18, 1439-1442.

(Continued)

*Primary Examiner*—John Rivell
*Assistant Examiner*—Atif H Chaudry
(74) *Attorney, Agent, or Firm*—Frommer Lawrence & Haug LLP; Ronald R. Santucci

(57) ABSTRACT

A microfluidic device comprises first and second inlet passages (13) for respective immiscible fluids, these inlet passages merging into a third passage (8) along which the two fluids flow under parallel laminar flow conditions, the third passage being formed with a constriction or other discontinuity (9) causing the two fluids to form into a flow of alternate segments.

26 Claims, 20 Drawing Sheets

U.S. PATENT DOCUMENTS

| | | | |
|---|---|---|---|
| 6,171,865 B1 | 1/2001 | Weigl et al. | 436/52 |
| 6,262,907 B1 | 7/2001 | Lien et al. | 365/49 |
| 6,368,871 B1 | 4/2002 | Christel et al. | 436/180 |
| 6,391,541 B1 | 5/2002 | Petersen et al. | 435/5 |
| 6,431,476 B1 | 8/2002 | Taylor et al. | 241/1 |
| 6,440,725 B1 | 8/2002 | Pourahmadi et al. | 435/288 |
| 6,454,945 B1 | 9/2002 | Weigl et al. | 210/634 |
| 6,509,085 B1 * | 1/2003 | Kennedy | 428/188 |
| 6,524,456 B1 | 2/2003 | Ramsey et al. | 204/450 |
| 6,541,213 B1 | 4/2003 | Weigl et al. | 435/7.1 |
| 6,582,963 B1 | 6/2003 | Weigl et al. | 436/52 |
| 6,766,817 B2 | 7/2004 | da Silva | |
| 6,818,185 B1 | 11/2004 | Petersen et al. | 422/102 |
| 7,129,091 B2 * | 10/2006 | Ismagilov et al. | 436/34 |
| 2001/0012612 A1 | 8/2001 | Petersen et al. | 435/5 |
| 2001/0055546 A1 | 12/2001 | Weigl et al. | 422/100 |
| 2002/0019060 A1 | 2/2002 | Petersen et al. | 435/514 |
| 2002/0039783 A1 | 4/2002 | McMillan et al. | 435/287.2 |
| 2002/0040754 A1 * | 4/2002 | Tomita et al. | 156/87 |
| 2002/0042125 A1 | 4/2002 | Petersen et al. | 435/287.2 |
| 2002/0045246 A1 | 4/2002 | McMillan et al. | 435/306.1 |
| 2002/0055167 A1 | 5/2002 | Pourahmadi et al. | 435/287.2 |
| 2002/0058332 A1 | 5/2002 | Quake et al. | 435/288.3 |
| 2002/0090644 A1 | 7/2002 | Weigl et al. | 435/7.1 |
| 2002/0142618 A1 | 10/2002 | Parce et al. | 438/751 |
| 2002/0155032 A1 | 10/2002 | Liu et al. | 422/100 |
| 2002/0166592 A1 | 11/2002 | Liu et al. | 137/825 |
| 2002/0168780 A1 | 11/2002 | Liu et al. | 436/180 |
| 2002/0175079 A1 | 11/2002 | Christel et al. | 204/601 |
| 2002/0182747 A1 | 12/2002 | Beebe et al. | 436/180 |
| 2002/0187547 A1 | 12/2002 | Taylor et al. | 435/306.1 |
| 2003/0124619 A1 | 7/2003 | Weigl et al. | 435/7.1 |
| 2003/0145894 A1 * | 8/2003 | Burns | 137/833 |
| 2003/0175165 A1 | 9/2003 | Liu | 422/100 |
| 2003/0201022 A1 | 10/2003 | Kawai et al. | 137/828 |
| 2003/0211507 A1 | 11/2003 | Hatch et al. | 435/6 |
| 2004/0007463 A1 | 1/2004 | Ramsey et al. | 204/450 |
| 2004/0166031 A1 | 8/2004 | Taylor et al. | 422/103 |
| 2004/0200909 A1 | 10/2004 | McMillan et al. | 241/1 |
| 2005/0042137 A1 | 2/2005 | Petersen et al. | 422/58 |

FOREIGN PATENT DOCUMENTS

| | | | |
|---|---|---|---|
| JP | 2002-277478 A | | 9/2002 |
| JP | 2002277478 | * | 9/2002 |
| WO | WO 99/05512 | | 2/1999 |
| WO | WO 99/09042 | | 2/1999 |
| WO | WO 99/09042 A | | 2/1999 |
| WO | WO 01/12327 A1 | | 2/2001 |
| WO | WO 0164332 | | 9/2001 |
| WO | WO 02/12856 A | | 2/2002 |
| WO | WO 02/12856 A1 | | 2/2002 |
| WO | WO 02/23163 A1 | | 3/2002 |
| WO | WO 02/064253 A2 | | 8/2002 |
| WO | WO 02060810 | | 8/2002 |
| WO | WO 02/076878 A3 | | 10/2002 |

OTHER PUBLICATIONS

Paul J.A. Kenis, et al., Fabrication Inside Microchannels Using Fluid Flow, vol. 33, No. 12, 2000, Accounts of Chemical Research.

Backstrom, Kenneth et al.: "Design and Evaluation of a New Phase Separator for Liquid-Liquid Extraction in Flow Systems", *Analytica Chimica Acta*, 169 (1985) pp. 43-49.

Nord, Lage et al.: "Extraction Based on the Flow-Injection Principle", *Analytica Chimica Acta*, 164 (1984) pp. 233-249.

Backstrom, Kenneth et al.: "Dispersion in Phase Separators for Flow-Injection Extraction Systems", *Analytica Chimica Acta*, 187 (1986) pp. 255-269.

Nord, L. et al.: "Extraction Rate in Liquid-Liquid Segmented Flow Injection Analysis", *Analytica Chimica Acta*, 194 (1987) pp. 221-233.

Karlberg, Bo et al.: "Extraction Based on the Flow-Injection Principle", *Analytica Chimica Acta*, 98 (1978) pp. 1-7.

* cited by examiner

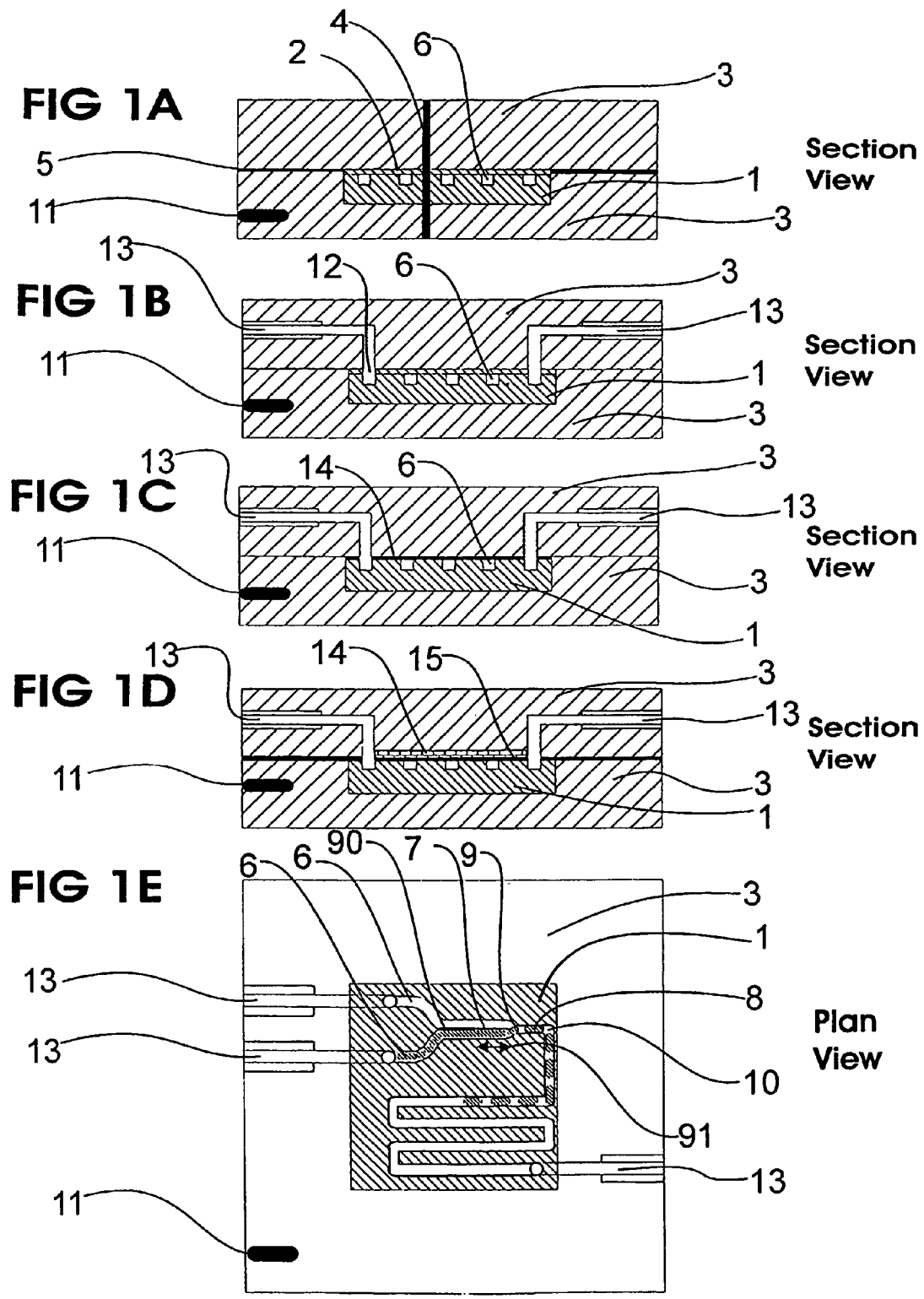

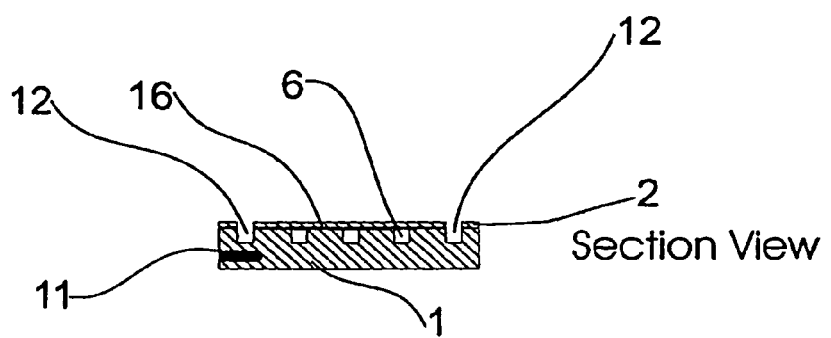
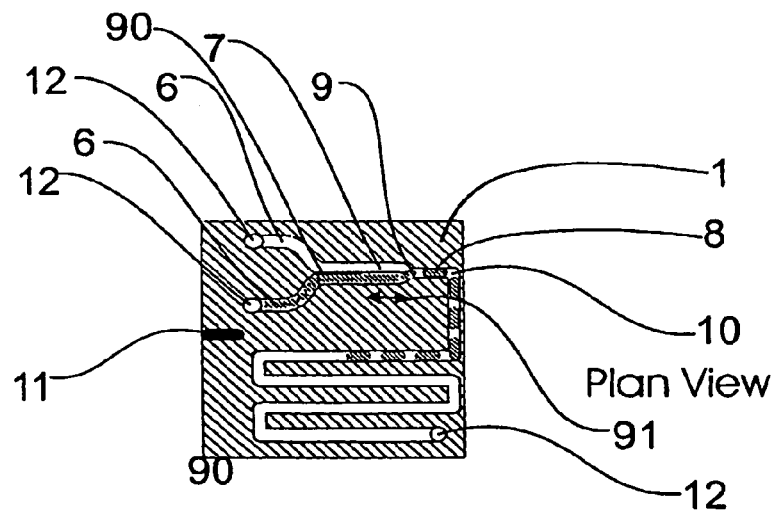

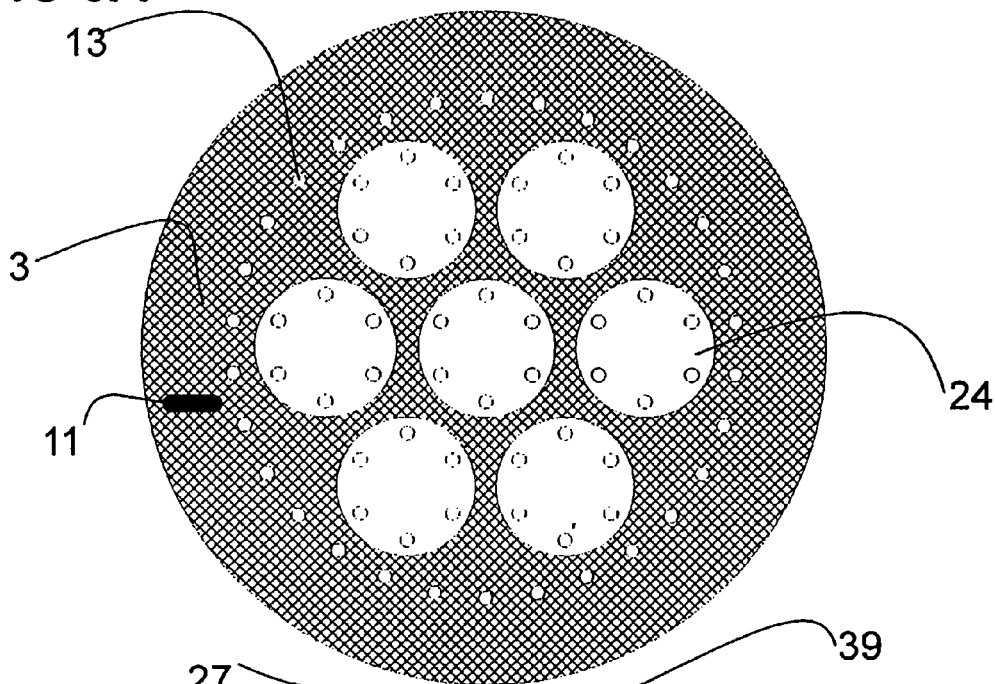
FIG 5A
FIG 5B PLAN VIEW
SIDE VIEW
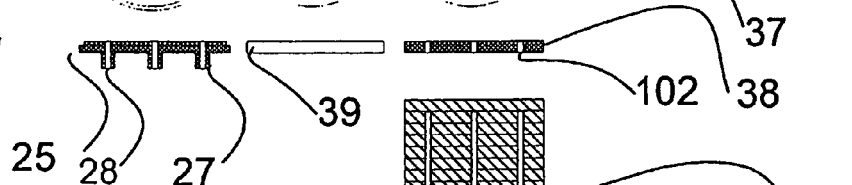
FIG 5C
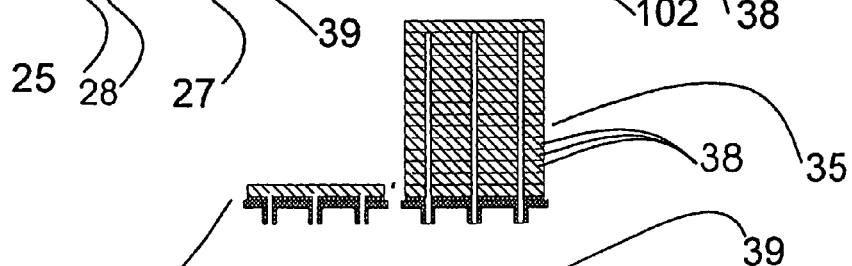
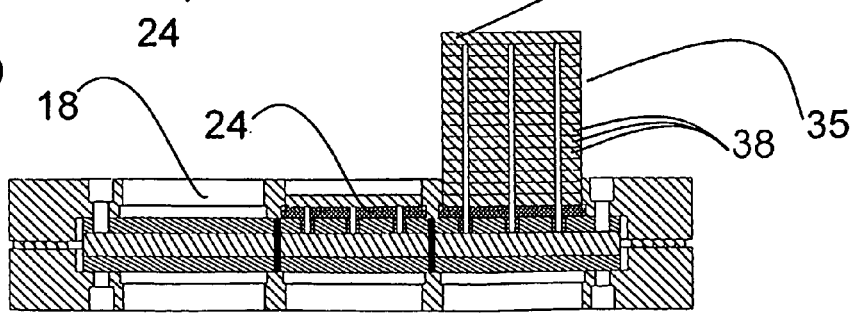
FIG 5D

SIDE VIEW

PLAN VIEW

MICROFLUIDIC DEVICE AND METHODS FOR CONSTRUCTION AND APPLICATION

This application is a 371 of PCT/GB2003/004976 filed on Nov. 14, 2003, published on May 27, 2004 under publication number WO 2004/043598 A1 which claims priority benefits from British Patent Application No. GB 0226691.4 filed Nov. 14, 2002.

FIELD OF INVENTION

The present invention relates to microfluidic devices and assemblies, methods for their construction with preferred embodiments and methodologies for the functional operation of such.

BACKGROUND

The miniaturisation of chemical processes onto chip-based platforms enables a plethora of novel industrial applications of existing and new chemistry, biochemistry, biomolecular science and particle science in both analysis, synthesis, assembly, decision making and computing. For example, molecular synthesis in micron-scale reactors benefits from (i) fast reaction kinetics, and (ii) high specific-areas which facilitates greater control of and/or the use of highly exothermic reactions. Many advances in so-called, microfluidics have been made in recent years. Nevertheless, known devices and methods for the manipulation of fluids in miniaturised tubes, ducts and vessels have not met all the requirements of industry. For example, sterilisation of, and the maintenance of an inert atmosphere in, microfluidic ducts remains a problem hampered by the materials from which many devices have been constructed. Additionally, the use of highly corrosive fluids and high temperatures again requires very strict attention to the materials from which devices are fabricated, which, in turn, has serious implication for mass-manufacture of such devices and assemblies of such. Accordingly, special attention must be made to the suitability of constructional materials, the unit costs of manufacture, the rapidity of manufacture, including tooling time for mass-production, and the translation of prototyping methods to mass-production. Constructional materials may include a glass, ceramics, stainless steel and other metals or alloys, silicon, polymers, paper and others. Glass-based substrates have been successfully manufactured, but limited, to some extent, by the complexity of 3-dimensional geometry that is cost-effectively feasible. Also, external fluidic interconnect solutions remain crude. Photostructurable glasses (e.g. Fotoran made by Schoot) are very expensive, sometimes 200× the cost of polymer substrates, and require several expensive and hazardous processing steps (e.g. use of HF) and specialised equipment (e.g. quartz based optics for lithography). Stainless steel chips can be manufactured but are limited with respect to 3-dimensional geometries attainable and the surface quality possible, even with MicroElectroDischarge Machining, is frequently of insufficient resolution for microfluidic applications. The technique suffers from high unit-cost production and very limited availability of high resolution machining tools. Silicon based microfluidic devices, such as microreactors, have been made and benefit from available tools for silicon micromachining and fusion/anodic bonding procedures for bonding together multilayered devices. However, silicon is relatively expensive for mass fabrication of relatively large-format chips which may sometimes have a short-lifespan. In addition, with exceptions, interconnect solutions remain inelegant and low-pressure and silicon denies the use of high field strength electric fields for the generation of electro-kinetic flow and certain molecular purification processes.

Many polymers (e.g. polysulphone, polycarbonate, polymethylmethacrylate) have been utilized for the fabrication of microreactors but most have been unsuitable for use with very aggressive liquids such as acids (e.g. nitric acid) and solvents (e.g. acetonitrile). In addition, the presence of certain substances incorporated into the polymer matrix, such as plasticisers, may cause contamination during usage, as those compounds leach from the substrate matrix into the fluids within the ducts on the chip. Particularly, for many synthetic reactions the preferred substrate material would be a fluoropolymer such as polytetrafluoroethylene $(C_2F_4)_n$ [PTFE]. However PTFE and related variants are less easily micromachined to provide fluidic ducts of micron sized dimensions and very difficult to join with itself to form enclosed microreactor ducts. It is a purpose of the current invention disclosed herein to provide a cost-effective resolution to the latter technical problems and enable the manufacture of suitable chip-based platforms for a wide range of industrial-scale diagnostic and synthesis operations.

Additionally, fluid flow in microscale ducts is characterised by laminar flow conditions resulting from characteristically low Reynolds number regimes. This causes a problem with mixing of fluids and it is a purpose of the invention disclosed herein to provide a solution to that technically limiting issue. Also, fluid flow in micron scale ducts is usually characterised by continuous streams of a given fluid phase. A contrasting method is where immiscible phase fluids are caused to flow along a duct in serial discontinuous aliquots. The generation of such segmented flow streams can be enabled by bringing together two streams of immiscible fluid and causing them to merge at a so-called T-junction. This methodology has not met all the needs of industry. For example, such device configurations are frequently only stable for a narrow range of absolute flow rate conditions and relative flow rates of the immiscible phase liquids. In particular, it can be difficult to control the generation of segmented flow streams with equal volumes of the immiscible phases, especially at low flow rates required by many applications. In addition, back-pressure can be considerable, especially in ducts of narrow (<100 microns width, depth, both or diameter) and very narrow (<25 micron width, depth, both or diameter) dimensions. It is, therefore, a purpose of the invention disclosed herein, to provide improved solutions for the generation and subsequent manipulation of segmented flow streams in micron scale ducts.

Devices for the manipulation of fluids may be used for analytical and synthesis purposes. Frequently, for a wide range of functional operations in both analytical and synthesis techniques it is necessary to elute precise volumes of fluids in a highly repeatable manner. For example, in titrations, 'split and mix' procedures, formation of microparticles such as artificial cells and nanoparticles such as quantum dots. Because the volumes of liquids are usually very small it is frequently difficult to meet the exacting requirements of industry and solutions to date are generally insufficient to meet all needs. It is a further purpose of the invention disclosed herein to provide device configurations and methods to improve substantially on those currently available. Furthermore, notwithstanding that devices and methods currently available for the controlled volumemetric elution of liquids, do not meet current needs, the subsequent manipulation of small liquid volumes also requires improvements. In particular, there is a need to improve on techniques for altering the morphology of liquid samples, their conversion to non-liquid forms and the ability to encapsulate such small samples with films of other materials. It is also a further purpose of the invention disclosed herein to provide further devices and associated methods to meet these needs.

SUMMARY OF THE INVENTION

In accordance with a first aspect, a fluid manipulation device is described, which comprises a device composed of, at least, two distinct fluoropolymer based substrate layers which may be composed of bulk fluoropolymer or fluoropolymer- or fluoropolymer-based coatings applied to other non-fluoropolymer bulk material substrate layers. The fluoropolymer bulk material layer(s) or applied coatings may include PTFE, Teflon®, Teflon®AF, Teflon®NXT, Teflon® G, Teflon® PFA, Teflon® PFA HP Plus, Dyneon™, CYTOP®, Teflon® PFTE-silicone adhesive film (product 5490 of 3M). Additionally, in accordance with this first aspect, the fluid manipulation device is provided with at least two ducts, for the passage and/or storage of immiscible fluids.

It will be understood by those skilled in the art that either of the immiscible fluids may include aqueous matrices, supercritical fluids, supercritical Helium-3, organic solvents, ionic liquids, inert fluids such as perfluorinated alkanes, perfluoroethers (including but not limited to Galden®, Fluorinert™), oils, acids, gasses, suspensions of living (including cryopreserved) cells, organelles and tissues, suspensions of preformed particulate materials such as chromatographic separations media, tissue scaffold precursors, etc.

It will further be understood by those skilled in the art that in turn the liquids may incorporate other components including (but not limited to): smaller particles of polymers (gelled or crosslinked) including non-biodegradable polymers such as (but not exclusively) ethylene vinyl acetate, poly(meth) acrylic acid, polyamides; biodegradable polymers including synthetic polymers such as polymers of lactic acid and glycolic acid, polyanhydrides, poly(ortho)esters; natural polymers such as alginate and other polysaccharides including dextran and cellulose, collagen, chemical derivatives thereof, albumin and other hydrophilic proteins, zein and other prolamines and hydrophobic proteins, copolymers and mixtures thereof; bioadhesive polymers including bioerodible hydrogels, polyhyaluronic acids, casein, gelatin, glutin, polyanhydrides, polyacrylic acid, alginate, chitosan, poly(methyl methacrylates), poly(ethyl methacrylates); antibodies, enzymes, abzymes, liposomes, antibiotics, nucleic acids and associated promoters, supercoiled DNA, oligonucleotides with <30 nucleotides, genes of more than 30 nucleotides with and without expression promoters; a wide range of pharmaceutical molecules, living cells, organelles, bacteria, viruses, viral vectors, metallic particles, magnetic particles, quantum dots, radioactive particles or radioactive-tagged molecules, fluorescent-chemi-luminescent- and/or bio-luminescent particles, molecularly imprinted polymers, tissue scaffold precursors, semiconductor devices, micron-scale RF transponders, liquid crystals, porous silica particles such as beads, porous silicon particles and others.

The two ducts are arranged to be separated by a thin partition (typically less than 500 um, preferably less than 10 um and most preferably less than 1 micron) until a point at which the partition is no longer present. The two parallel, closely associated ducts join to a third duct (hereafter called the common duct) measuring, optionally 500 microns to 100 nanometers in either cross-sectional dimensions of width, depth, mean diameter, but of a length, at least, ten times the minimum width of either the two preceding ducts, so that the different fluids moving in parallel flow formation along the third duct attain a very stable flow profile free from shear forces and microturbulence at their interfacial juncture. The cross-sectional area of the third duct is preferably, equal to the sum of the cross-sectional area of the two preceding ducts. The third duct axially joins a fourth duct (hereafter called the segmented flow duct) that is of cross-sectional area and width at least 25% most preferably 50%, that of the third duct. At the juncture of the said common duct and constriction duct, the permanent or temporary, 2- or 3-dimensional, constrictions in cross-sectional geometry are configured such that when two or more streams of immiscible fluids are caused to move within the common duct the fluids may be forced from a laminar unmixed flow condition to form contiguous serial segments of the immiscible liquids in the fourth duct. The immiscible liquids may be caused to move within the ducts by means of applied pressure—(negative or positive), electrokinetic forces (where charged functional groups are provided on the walls of the fluid bearing ducts), displacement (e.g. by the action of a plunger caused to move by the application of a mechanical force from a human being) or centrifugal forces (e.g. by means of rotation about an axis). The absolute rate of flow of fluid segments may be adjusted by varying, in equal amounts, the flow rates of the immiscible fluids. The relative volumes of the immiscible liquids formed as fluid segments may be adjusted by varying the relative flow rates of the same immiscible liquids. At the point at which the two or more ducts merge the immiscible fluids remain substantially in parallel (laminar) formation and continue in such formation as they are caused to move along the common duct. When or where the common duct(s) is/are physically constricted (permanent or temporarily) the liquid components are forced together in a more constrained environment. At the point(s) of constriction the laminar flow may become interrupted such that one liquid will move into the narrower section of the duct first to be followed by aliquots of the second and other immiscible liquids in a manner determined by the relative contact angles of the fluid component phases, the surface energy of the fluoropolymer material, the force applied to propel the fluids, elastic properties of the component liquid phases and the precise 2- and 3-dimensional geometrical nature of the physical constriction. This allows the selective passage of given phase liquids to pass along the duct establishing a repeated and ordered segmented stream of liquid phase materials. Because the flow is manipulated in a controlled volume environment and because all the environmental parameters (e.g. but not limited to pressure, flow-rate, temperature, humidity, surface energy) can be finely controlled, fluid segments are produced to a highly accurate volume and morphological specification. This fine control of fluid segment volume and geometrical morphology gives rise to many advantages that can be of benefit to analytical and synthesis operations when conducted in the fluid based device. The absolute lengths of fluid segments may be controlled in a time-varying dynamic manner by controlling the absolute flow rate of the fluids into and along the common fluid duct. The relative lengths of the fluid segments may be determined by providing ducts of differing cross-sectional area for the separated flow streams prior to merger in the common fluid duct. The relative lengths of the fluid segments may be determined in a time-varying dynamic manner by controlling the relative flow rates of the separated flow streams prior to merger in the common fluid duct.

Additionally, in accordance with this first aspect, the said constriction feature is utilised, at least (but not exclusively), for the controlled volume elution of immiscible fluid phase components. Additionally, in accordance with this first aspect, the device is designed and manufactured, specifically and uniquely, for the creation of, and functional operation with, at least one segmented flow stream of immiscible fluid-based matrices, which are favourably enabled by the use of low surface energy fluoropolymer-based manufacturing materials. Additionally, in accordance with this first aspect, the said fluidic ducts are machined, most preferably by means of reactive ion etching, even more preferably with the assistance of an inductively coupled plasma, even more preferably where the fluoropolymer-based or coated substrates and/or reactive plasma are cooled with a cryo-facility. A particular advantage of utilising reactive ion etching of PTFE and related polymers is that it is frequently difficult to micromachine by other means.

For instance, because pure PTFE it is not a thermoplastic it is not easily moldable and as such does not lend itself to microstructuring by embossing or injection molding techniques. When ablated by laser machining [e.g. copper vapour, excimer] the ablated surface is often highly irregular and generally unsuited to microfluidics chemistry and other applications. Furthermore, reactive ion etching is a parallel process in that all areas of substrate exposed to the plasma are etched at the same time which renders it suitable to manufacturing of substrates suitable for microfluidics, microchemistry and other applications where a relatively large substrate format is required. This contrasts with excimer laser micromachining which is frequently used (though not always) in a serial manner where the laser beam is moved over a workpiece to define a geometry.

Additionally, the reactive ion etching process lends itself to mass-production by virtue of available equipment commonly employed for silicon and silica micromachining. Automated cassette-loading systems with large wafers could facilitate high-volume production with the advantage that complex, high aspect ratio, nanoscale features could be incorporated which is not easily achieved with medium volume micro-manufacturing techniques such as injection micromolding. Reactive ion etching of fluoropolymers may be used as both a prototyping and mass-manufacturing process. This provides for a seamless transfer of processing technology to different scales of production. This holds an advantage over embossing and injection molding where separate tools have first to be constructed which is both time-consuming and expensive. Because manufacturing costs of components made by etching are determined, in part, by processing time, accelerated etching times allows faster processing operation to be done with the result of higher unit throughput. Unit costs of manufacture are thus reduced. Less preferably, the ducts may be machined by CNC milling, preferably where substrates are cooled to lessen the surface roughness of the finished surfaces. Less preferably the said ducts may be machined in thermoplastic variants of fluoropolymer based substrates by means of hot embossing, injection molding, laser ablation (excimer or copper vapour) and broad area ion-beam milling.

Additionally, in accordance with this first aspect, the immiscible fluids are located and manipulated within the said ducts, the device having no operative fluid ports for communication external to the device. Additionally, in accordance with this first aspect, the device incorporates a passive (batteryless and wireless) radio frequency transponder device to provide individual device identification. Additionally, in accordance with this first aspect, the fluoropolymer-based or fluoropolymer-coated layers are encased under compression within a recess machined in between two or more encasement layers of a dissimilar thermoplastic (e.g. PMMA, polycarbonate) that may be mechanically bonded together or joined by thermal, thermo-compression or thermally assisted (e.g. by inductive heating) compression bonding. The fluoropolymer and/or fluoropolymer based layers are provided with a (combined) slightly larger (by 10 microns and up to 100 microns) thickness dimension than the depth of a recess provided in the separate casement. During thermal bonding of the casement the fluoropolymer-based insert becomes embedded within it such that upon cooling the fluoropolymer-based layers are sandwiched at high pressure. This results in a mating between the fluoropolymer-based surfaces that are fluid tight at levels highly useable for low-pressure applications, particularly in chemistry and biotechnology. Preferred embodiments of the device may be utilised for a wide range of industrial research, development and manufacturing operations, as a singular device, or as 2 or more operating in serial or parallel arrangements and/or as a device interfaced with other equipment. Additionally, in accordance with this first aspect the device is manufactured substantially in a planar layer-like format, each of which are of a geometrical area >350 square millimetres, typically 8000 square millimetres and 32000 square millimetres, most preferably in circular format, less preferably in rectangular format, each layer being at least 40 microns in thickness, with one layer being at least 475 microns in thickness.

In accordance with another aspect, the fluid manipulation device is configured with a port suitable for fluidic communication with the external environment and/or equipment, and/or mammalian body. Such equipment may include, but not be limited to, rotary, piston and other displacement pumps; vacuum lines, gravitationally driven fluid streams; analytical apparatus for mass spectrometry, liquid chromatography, particle characterisation, nuclear magnetic resonance, impedance spectroscopy, UV/VIS/IR absorption; and sample storage (including but not limited to microtitre plates, vials, collection vessels, porous materials in bead, strip, card and disc-like formats, dry storage plates including porous silicon microspot arrays).

In accordance with another aspect, the fluid manipulation device may be configured with two ports suitable for said fluidic connection to external environment, mammalian body and equipment.

In accordance with another aspect, the fluid manipulation device may be configured with three ports suitable for said fluidic connection to external environment, mammalian body and equipment.

In accordance with another aspect, the fluid manipulation device may be configured with more than three ports suitable for said fluidic connection to external environment, mammalian body and equipment.

In accordance with another aspect, the fluid manipulation device may be manufactured, such that one or more substrate layers, formed of bulk fluoropolymer or fluoropolymer coated material, utilises a thermoplastic fluoropolymer that melts when raised above its glass transition temperature. The juxtaposed layers may be hermetically joined by the inductive heating (upon exposure to strong electromagnetic fields) of a metallic (e.g., but not limited to, titanium, aluminium, chromium) interlayer film deposited on to one or more of the said layers, and which, upon inductive heating to above the glass transition temperature, causes local melting of the thermoplastic fluoropolymer materials, which upon subsequent cooling (after removal of the inductive heating element), forms a hermetic and mechanically secure seal.

In accordance with another aspect, the fluid manipulation device may be manufactured, such that one or more substrate layers, formed of bulk fluoropolymer or fluoropolymer coated material, utilises a thermoplastic variant of fluoropolymer that melts when raised above its glass transition temperature. The juxtaposed layers may be hermetically joined by the combined application of heat and pressure, raising the surface temperatures of the layers where they adjoin to at least 5° C. above the glass transition temperature. This causes local melting of the thermoplastic fluoropolymer materials, which, upon subsequent cooling, forms a hermetic and mechanically secure seal.

In accordance with another aspect, the fluid manipulation device may be provided with the additional incorporation of protrusions of the thermoplastic encasement material, that, when assembled, fit through via holes provided in the fluoropolymer-based or -coated substrates, and mate with corresponding protrusions from the opposite side. This mating may be caused by simple butt joints or by a number of geometrical arrangements where 'plug and socket' type modifications to the protrusions are made. These protrusions may be securely but non-permanently joined, simply by mechanical means, and/or made permanent by thermo-compression bonding. The joined protrusions act to provide additional strength to the hybrid assembly particularly on large format structures and prevent fluid escape between the layered fluoropolymer-based or -coated parts. Small through-vias may be provided through 'plug and socket' type protrusions such that an oversized pin (preferably made, though not exclusively, from stainless steel) driven through the vias will enhance physical contact and the security of the fastening achieved, or by use of a bolt and nut tightened to secure a mechanical and hermetic fastening.

In accordance with another aspect, the fluid manipulation device may be manufactured where one or all of the fluoropolymer based layers comprises a fluoropolymer-based thin (typically 1-3 microns) film (e.g. Teflon® AF) film applied to an optically transmissive material (e.g. but not limited to borosilicate glass, Pyrex, QC PMMA) such that the fluid contained within the fluid ducts and receptacles is enclosed completely by fluoropolymer based materials whilst allowing for the passage of light which may be used for imaging, and/or photo-excitation of devices (e.g. actuators) or phenomena (e.g. photocatalysis, gelling). This thin film may be applied by means of various techniques such as spin-coating [solutions or nanoparticle suspensions], RF magnetron sputtering or Plasma Enhanced Chemical Vapour Deposition, optionally followed by an annealing process, also optionally followed by exposure to an oxygen or oxygen/ammonia plasma to enhance adhesive and/or (chemical) functionalisation qualities.

In accordance with another aspect, the fluid manipulation device may be provided with fluidic ducts and receptacles that are machined in both sides of the fluoropolymer based or coated substrate layers providing for double sided fluidic substrates. In such devices a third fluoropolymer-based or -coated layer is required to provide a fluidic environment where all parts of the fluidic system are provided by fluoropolymer-based materials.

In accordance with another aspect, the fluid manipulation device may be provided with one or more fluidic vias through the substrate layers providing fluidic communication between both sides of the substrate.

In accordance with another aspect, the fluid manipulation device may be manufactured with two or more single- or double-sided fluidic substrate layers that may be stacked upon each other, directly or indirectly (optionally, with a separating layer) to create a multi-layer assemblage (e.g. up to 1000 or more substrate layers). These layers may have identical or dissimilar function. Such devices may incorporate one or more additional substrate layers, the function of which is to act as a manifold for distributing fluid based matrices from one or more input and output tubes to one or many ducts configured to generate segmented flow streams.

In accordance with another aspect, the fluid manipulation device may be manufactured such that, additional, smaller modules may be attached aboard the device so as to provide additional functionality. These modules may incorporate sensors (e.g. impedance sensor measuring liquid purity), actuators (e.g. diverters of fluid flow) reservoirs of reagents (e.g. fluids, particles, etc.) or may function to provide clusters of one or more additional input-output fluid ports to the fluidic substrate layers or stack of substrate layers. These modules may be attached by means of one or more plug-like projections from the smaller modules which respectively mate with socket-like receptacles provided in the substrate layers, or encasement layers of the device. The modules may be stacked one upon another as described in International Patent application WO02/060810. In a preferred embodiment, 6 plug-like projections are arranged peripherally and circumferentially on the underside of disc-like modules at separation angles of 60°, but the number, position and format may take many variant forms. The plug-socket connectors allow for mechanical fastening, fluid transport, electrical connectivity, optical connectivity, the intimate application of electrical and magnetic fields and the intimate application of inductive heating.

In accordance with another aspect, the fluid manipulation device may be manufactured where the encasement layers are manufactured from a non-polymer material (most preferably, though not exclusively stainless steel) joined not by thermo-compression bonding but rather through the use of one or more bolts extending between casement layers so as to form a mechanically tight assemblage of fluid substrate layers.

In accordance with another aspect, the fluid manipulation device may be manufactured where no encasement layer is provided, the fluid substrate layers being preferably constructed from thermoplastic fluoropolymer (e.g. Teflon® AF, Teflon® NXT, Teflon®G, Teflon® HP, Teflon® HP Plus) bulk materials or thermoplastic fluoropolymer coated material of another polymer (e.g., but not exclusively, polycarbonate, polymethylmethacrylate), the said layers being joined by thermal, thermally assisted, ultrasonically assisted or thermo-compression bonding.

In accordance with another aspect, the fluid manipulation device may be provided with a fluid port such that one of the fluid phase components is introduced on to the device from an external supply.

In accordance with another aspect, the fluid manipulation device may be provided with two fluid ports such that two of the fluid phase components are introduced on to the device from external supplies.

In accordance with another aspect, the fluid manipulation device may be provided with sufficient ports that all of the fluid phase components are introduced on to the device from external supplies.

In accordance with another aspect, the fluid manipulation device may be provided with a fluid port such that one of the fluid phase components, or products of, may be exported from the device to an external location (such as a collection vessel, instrument, mammalian body, atmosphere, or vacuum).

In accordance with another aspect, the fluid manipulation device may be provided with two fluid ports such that two of the fluid phase components, or products of, may be exported from the device to an external location (such as a collection vessel, instrument, mammalian body, atmosphere, vacuum).

In accordance with another aspect, the fluid manipulation device may be provided with many fluid ports such that three or more of the fluid phase components, or products of, may be exported from the device to an external location (such as a collection vessel, instrument, mammalian body, atmosphere, vacuum).

In accordance with another aspect, the fluid manipulation device may be manufactured such that one or more geometrical constrictions in a fluid duct, designed to cause segmented flow of immiscible fluids, are replaced or enhanced with a permanent step change in surface energy achieved by the differential patterning of the surface energy states. These altered energy states may be achieved in a time-non-varying manner by spatially-variable exposure of the surfaces to reactive plasmas, the grafting of functional moieties or the selective patterning of a dissimilar fluoropolymer film over the substrate layer. One example is where a thin film of Teflon® AF (a copolymer of Teflon® and perfluoro-2,2-dimethyl-1, 3-dioxole) is used to coat the surface of the fluidic ducts but where an electronegative charge is selectively implanted, in a spatially-variable manner, in the film by, for example, use of a back-lighted thyratron electron gun.

In accordance with another aspect, the fluid manipulation device may be manufactured such that one or more geometrical constrictions in a fluid duct, designed to cause segmented flow of immiscible fluids, is replaced with a time-varying step change in surface energy that may be actuated to cause otherwise laminar flows of immiscible phase liquids to reconfigure to segmented flow. This may be achieved by electro-wetting where one or more insulated electrodes apply and determines the shape of an electric field at given points within the fluidic duct(s) so as to cause, otherwise, laminar flows of immiscible phase liquids to reconfigure to segmented flow. A similar result may also be achieved by photo-wetting where one or more addressable photo-responsive surfaces are incorporated within the common fluidic duct such that when excited by illumination with incident light, the altered surface energy states, causes otherwise laminar flows of immiscible phase liquids to reconfigure to segmented flow. These altered energy states may be induced in, for example, spatially-variably deposited thin films of silicon (e.g. by electron beam deposition) or photo-responsive functional moieties grafted on to the surface of the fluoropolymer or fluoropolymer coated ducts.

In accordance with another aspect, the fluid manipulation device may be manufactured where the geometrical constriction in a fluid duct, designed to cause segmented flow of immiscible fluids, is enhanced or replaced with a cruciform junction of fluidic ducts whereby a separate duct crosses the path of the common fluidic duct. An intermittent DC voltage applied to the separate fluid duct which crosses the common fluid duct will cause the momentary, preferential, electrokinetic movement of aqueous fluids from the common fluidic duct, resulting in the conversion of otherwise laminar flows of immiscible phase liquids to reconfigure to segmented flow within the common fluidic duct.

In accordance with another aspect, the fluid manipulation device may be provided with one or more ducts, in which segmented flow has been created, which said ducts split with partitions at a given point, to provide two or more separate ducts (referred to here for convenience as 'shredding ducts') which are smaller in cross-sectional dimensions. This partitioning into 'shredding' ducts cause fluid segments to break into smaller segments thus having a 'shredding effect'. One or more of the smaller ducts may also be similarly partitioned again, so causing further division of the fluid segments. The 2- and 3-dimensional geometries of the 'shredding ducts' may be selected such that the relative morphology of the fluid segments remains constant, or such that the morphology is significantly altered (for example to produce filamentous fluid segments). The smaller ducts may reduce in size to as little as 70 nanometers in width and 200 nm in depth.

In accordance with another aspect, the fluid manipulation device may be provided with two or more ducts, each said duct carrying immiscible component fluids, each of which have been configured to flow in segmented formation (hereafter called feeder ducts). The segmented flow ducts merge to form a common duct resulting in the coalescence of individual fluid segments, of the same phase, from the two or more previously separated segmented flow (feeder) streams. Each coalesced fluid segment assumes the internal circulation pattern typical of segmented flow, thus causing rapid mixing within a given segment. The device may be used to react/mix or dilute fluid phase components derived from the feeder ducts. The device may be used to advantageously (rapidly) mix aqueous solutions/suspensions which, otherwise, would remain relatively unmixed for a long duration whilst constrained under the laminar flow conditions that usually dominate in microfluidic environments. The device may be advantageously utilized to dilute one given fluid phase fed from one of the feeder ducts by altering the volume ratio of the immiscible phase components in the other feeder ducts.

In accordance with another aspect, the fluid manipulation device may be provided where the unit of operation for mixing dilution is replicated at least two or more times on the same device substrate or stack of substrates. Particularly, the multisite mixing and/or dilution capability allows the device to simultaneously mix and/or dilute reagents prior to dispensing into or onto a number of integral or external multiwell or multisite devices for the purposes of further processing operations (e.g. into the wells of a microtitre plate) or storage (e.g. on to selective sites of a MALDI plate device, or a porous material such as a bead, ceramic plate or layer of porous silicon).

In accordance with another aspect, the fluid manipulation device may be configured such that two or more aqueous flow streams are caused to flow along a common duct, which merges (as a constriction- or T-junction) with one or more separate ducts carrying an immiscible fluid, resulting in the formation of a segmented flow stream, the internal vortex flow patterns of which fluid segments causes the rapid mixing of the 2 or more aqueous liquid matrices, which would, under laminar flow conditions, otherwise, remain unmixed for a considerable period depending upon the Reynolds Number.

In accordance with another aspect, the fluid manipulation device may be manufactured such that a first duct carrying a segmented flow stream is joined at a juncture, by one or more additional ducts, preferably in serial succession, at which points of juncture the first duct is, optionally, geometrically enlarged in cross-sectional area (either in width, depth or both), and where, during the passage of fluid flow along the first duct, supplementary aliquots of fluid from the additional ducts may be injected or added to the volume of selected, or all, fluid segments in the first duct. The supplementary fluid added to the fluid segments is caused to mix rapidly by virtue of the internal flow vortex within the component fluid segments. The flow of fluid from the additional duct into the first duct may be caused by passive means where like solutions momentarily contact and 'pull off' an additional aliquot of fluid from the additional duct. Equally, the flow of fluid from the additional ducts may be caused by propulsive methods including positive displacement pump, electrokinetic injection (e.g. actuated by monitoring the passage of individual fluid segments in the first duct), piezoelectric actuator, and others.

In accordance with another aspect, the fluid manipulation device may be manufactured with one or more pressure sensors in the form of capillary gas-filled manometers. These are constructed as blind tributary ducts arranged at any angle between 0° and 180° to the first microfluidic duct along which fluids are caused to move. The first microfluidic duct may be any duct formed on the device for manipulation of fluids where there is non-segmented flow. The tributary ducts are preferably filled with a relatively inert gas such as, though not exclusively, argon, helium or nitrogen. Fluid within the first fluidic duct will rise into the tributary duct according to the prevailing pressure conditions. The tributary ducts function according to the principle that a change in gas volume provides a change in fluid pressure, i.e., an increase in fluidic pressure gives a decrease in gas volume. Therefore, by knowing the cross sectional area and length of the blind tributary ducts, the initial volume can be calculated and with the displacement of the fluid in the channel the increase/decrease of the pressure affected volume can be calculated. With liquid in the first microfluidic duct, the liquid level within the tributary duct rises to an initial pressure setting. According to pressure changes (for example, during fluid movement caused by the application of pressure) the pressure of the fluid increases and the fluid moves further along the tributary duct changing the volume of the trapped gas. Other geometrical arrangements of more than one tributary duct can provide information on fluid flow rate by indicating the pressure drop over predetermined length or over a fluid resistor caused by a constriction in the first fluid duct. The capillary manometers may be provide in a linear, serpentined, curved or coiled format and meniscus movements visualised by an optical device such as a CCD.

In accordance with another aspect, the fluid manipulation device may be provided with one or more peltier based microcooler devices which cause parts of the fluid duct(s) and their contents to be reduced in temperature. This may be particularly useful for a range of (bio)physiochemical operations such as replication of nucleotide sequences, protein crystallisation, polymer cross-linking by light- and ion-exchange means, exothermic chemical reactions and others.

In accordance with another aspect, the fluid manipulation device may be manufactured where a first duct carrying a segmented flow stream is constricted and reduced in cross-sectional area (width, depth, both, or diameter) so as to cause fluid segments formed in the first duct before the constriction, to change shape, such as becoming elongated or altered in cross-sectional profile (for instance, assuming a stellar-like or cruciform section). Optionally, such fluid segments may be caused to become less fluid in nature by partial or total polymerisation and/or gelling, by the selective exposure to light (most preferably ultraviolet, less preferably visible and infrared light) temperature alteration, ionic composition of external environment, or the presence of gelling/polymerisation or encapsulation agents injected into the flow stream or directly into individual fluid segments.

In accordance with another aspect, the fluid manipulation device may be manufactured where a first duct carrying a segmented flow stream is expanded in geometrical cross-sectional area (either in width, depth, both or mean diameter) by an amount sufficient to cause fluid segments in the first duct, before the point of expansion, to change shape from non-spherical forms, to a spherical format, the boundary layers of each segment no longer assuming intimate shear contact with the duct walls. Configured in this manner, the rapid internal vortex flow that can be induced within the fluid packets of segmented flow (due to shear contact with the duct walls during passage along the said duct) is lost as fluid segments assume a spherical format with no intimate shear contact with the duct walls. Following this methodology contiguous fluid segments become converted to trains of spheres of highly similar volume. The trains of spheres may be collected for usage or further processed.

It will be understood by those skilled in the art, given the benefit of this disclosure, that an ability to produce droplets of highly reproducible volume and shape has innumerable applications and uses where size and shape affect their function. An example is the size of particles (e.g. liposomes, alginate beads) designed to deliver pharmaceuticals and genes to target tissues within the mammalian body. Similarly the production of droplets of highly reproducible volume and shape is particularly useful in the production of foodstuffs, cosmetics, detergents and skin-care products.

In accordance with another aspect, the fluid manipulation device may be used where the contents (or part) of liquid segments are polymerised or crosslinked by exposure to electromagnetic radiation, [in the wavelength range 200-700 nm, most preferably in the long wavelength ultraviolet (LWUV) range or visible range, 320 nm or higher, and most preferably between about 365 and 514 nm]. Dyes and co-catalysts, such as amines, for initiating polymerisation may also be included in the liquid segments such that upon exposure to visible or long-wave ultraviolet light, active species can be generated. Light absorption by the dye causes the dye to assume a triplet state, which subsequently reacts with the amine to form an active species which initiates polymerization.

In accordance with another aspect, the fluid manipulation device may be used where the contents (or part) of liquid segments are ionically cross-linked by the exposure to appropriate gelling agents delivered through a subsidiary duct, joining the main duct carrying the segmented flow stream(s), at, or just after, the point of duct expansion. One example to illustrate this is the gelling of (typically, 1-12%) alginate solutions [which may in turn incorporate smaller particles or other components as described herein], where a segmented flow stream of sodium alginate and an immiscible phase such as an oil or perfluoroethers such as Galdens®, Fluoinert™, or organic solvent such as methylene chloride is created in a duct which incorporates an expansion zone. At the expansion zone the segments of alginate emerge as droplets (preferably, though not exclusively as spherical droplets) suspended within the flow of the immiscible phase, and due to the added exposure to weak calcium levels (typically 10 mM-200 mM $CaCl_2$) delivered in to the expansion duct from the subsidiary duct, the alginate droplets gel (optionally entrapping or immobilizing, for instance, cells or genes suspended within the alginate matrix) as calcium ions preferentially replace the sodium ions in the alginate. This example method produces gelled (non-exclusively) sphere-like droplets of highly precise and repeatable dimensions, not easily attainable by other means and lends considerable advantage to the use of alginate which is widely used in food, pharmaceutical, textile, and paper products, exploiting the properties for thickening, stabilizing, gel-forming, and film-forming. For instance, in gene delivery systems it is desirable to construct micron and nanometer sized capsules with high precision of morphological dimensions, thus assisting their targeted delivery to specific tissues within the mammalian body. As a further specific illustration, microparticles formed in this way, which are advantageously suitable for gene delivery, may be comprised of biocompatible bio-erodible hydrogels including polyhyaluronic acids, casein, gelatin, glutin, polyanhydrides, polyacrylic acid, alginate, chitosan, in which are suspended genes of greater than 30 nucleotides with specific expression promoters.

In accordance with another aspect, the fluid manipulation device may be used to function for the elution of liquid solutions and suspensions into gelled, polymerised, solidified materials in spherical volumes ranging from 0.1 cubic millimeter to 0.003 cubic micrometers of repeatably high precision volume.

In accordance with another aspect, the fluid manipulation device may be configured such that a first duct, along which is caused to move a segmented flow stream of immiscible fluids, is temporarily merged with another duct carrying one liquid phase component similar in phase to one of the liquid phase components located within the first duct. After the point of merger the flow streams remain in a common duct before then exiting through two separate ducts formed by splitting the common duct in two. At the point where the two ducts merge, the flow streams meet but remain substantially separated due to the laminar flow resulting from the low Reynolds number conditions. Despite this laminar flow, there is an attraction between like fluids in the two streams that merge at the junction, causing like fluids to coalesce and move out through one exit duct and the unlike fluids to move out via the other exit duct.

In accordance with another aspect, the fluid manipulation device may be used for the creation of quantum dots, and assemblages thereof, from a liquid phase. To illustrate this process, an illustrative example is described. In this embodiment, an organometallic precursor triocytlphosphine oxide (TOPO) are provided in separate immiscible fluids, formed on the device into segmented flow streams. The fluid segments containing the triocytlphosphine oxide (TOPO) may be selectively heated by incorporating an energy absorbing dye (e.g. an infrared-absorbing dye) or particulate material (titanium, platinum, palladium, to absorb light or induced electric fields) within the same fluid segments or the entire train of fluid segments may be heated by the direct application of a heating element (e.g. electrical resistance heater). Contiguous fluid segments in the segmented flow of the device enjoy a physical contact at the end of each fluid segment. As the segments are caused to move along the reactor this interfacial boundary is highly dynamic, and continually renewing. Mass transfer across this interfacial boundary can therefore be very rapid and is dependent upon several factors including the speed at which the segments are caused to move in the device. The rate at which the organic precursor is transferred to adjacent fluid segments containing the triocytlphosphine oxide (TOPO) may be controlled by adjusting the flow rate of the segmented flow stream. Equally, the mass transfer may be controlled by altering the geometry of the duct carrying the segmented flow such that an expansion (which may be for only a selected part of the duct) in the size of the duct will cause elongate fluid segments to assume a spherical form as freely moving droplets that have no contact with the duct walls, and thereby do not enjoy the rapid internal vortex flow. Accordingly, mass-transfer is adjusted.

It will be apparent to those skilled in the art, given the benefit of this disclosure, that duct geometries may be designed to provide precision control of mass-transfer and by which means assume accurate control of quantum dot nucleation conditions. Quantum dots are nano-scale crystalline structures which can transform the colour of light and have numerous applications ranging from computing, photonic and materials coating to biotechnology. The energy states of the dots can be largely controlled by the size of the dot. Typically, this is achieved by introducing a desired organometallic precursor into heated triocytlphosphine oxide (TOPO) that has been vigorously stirred under an inert atmosphere. As nucleation proceeds to further shell growth the solution changes through different colour regimes as the dot size increases. Precision control of quantum dot formation has been difficult to refine because it is not readily possible to achieve 'snap' control of nucleation thermal and other conditions. Subsequently, quantum dots are usually sized post-synthesis to obtain particles of specific character. Quantum dot formation in the device described offers a step-change advantage where thermal control may be exercised with considerable precision. In particular, with segmented flow the mass transfer can be almost instantaneously directed by switching between vortex flow and laminar flow, the latter in an expansion zone of the duct(s). In addition the fluoropolymer construction of the device allows the reaction to be conducted at sufficiently high temperatures, which would not be possible were it constructed from other polymers (e.g. polycarbonate), and the enclosed nature of the ducts can be utilised to control the required inert atmosphere conditions. The processing can be further elaborated by the introduction of further reagents through tributary ducts to the main duct carrying the segmented flow stream, for instance to alter the composition of subsequent layers around the core of the quantum dot.

BRIEF DESCRIPTION OF THE DRAWINGS

Embodiments of the present invention will now be described by way of examples only and with reference to the accompanying drawings, in which:

FIGS. 1A-1E show several variants of a first embodiment of fluid manipulation device in accordance with the invention;

FIGS. 2A-2B are sectional and plan views of a second embodiment of fluid manipulation device;

FIGS. 5A-5D are views of a fifth embodiment of fluid manipulation device;

DETAILED DESCRIPTION OF THE PREFERRED EMBODIMENTS

Figure 3A:
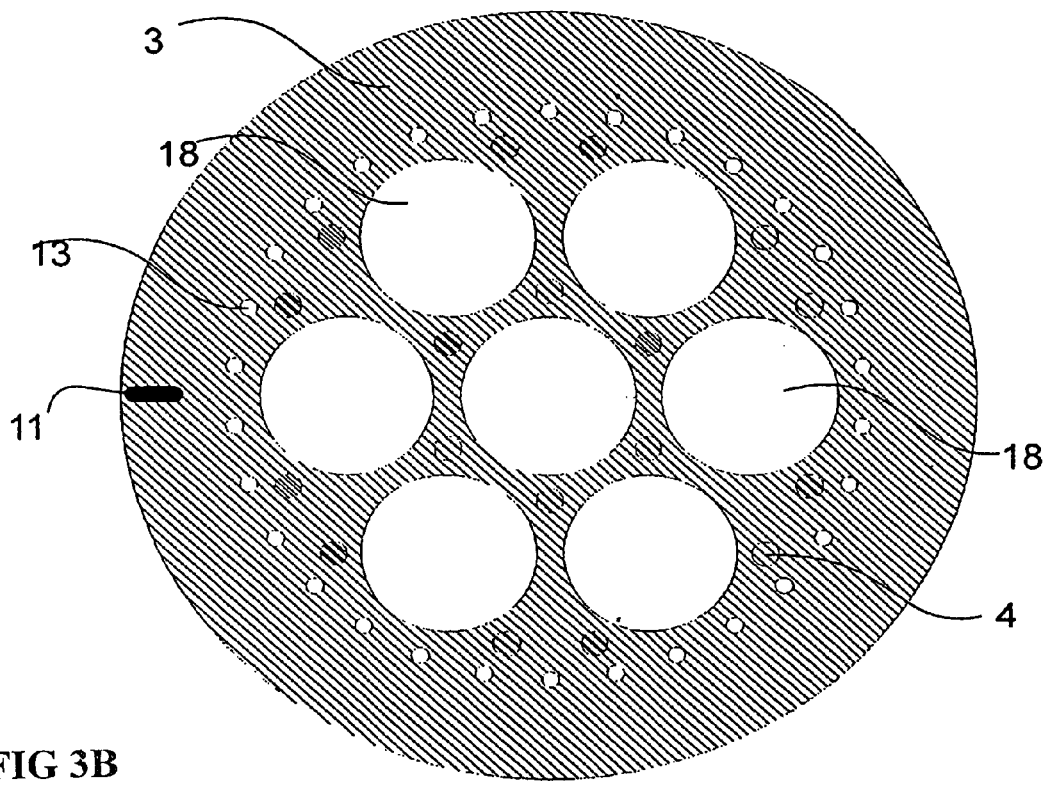
FIGS. 3A-3B are plan and sectional views of a third embodiment of fluid manipulation device.

FIGS. 1A-1E show various configurations for a fluid manipulation device. In FIGS. 1A-1B a first fluoropolymer-based or -coated substrate 1 and a second fluoropolymer-based or -coated substrate 2 are held in intimate juxtaposition by various means. In FIGS. 1A-1E the substrates are encased within two or more additional layers of casement material 3. The substrate layers sit within a cavity machined within the casement layers, the depth of which is slightly shorter than the combined thickness of the substrate layers. The casement material may extend, as projections 4, through vias in the substrate layers joining compatible protrusions on another corresponding casement layer. The casement material is a thermoplastic polymer welded together by thermocompression bonding or by inductive heating, of an optional thin metallic film 5 that may be applied to one of the two layers, to >Tg+5° C. of the thermoplastic polymer. At the points where the casement materials meet, the surface may be provided with interlocking inter-digitations useful for alignment, allowing for variations in the thickness of substrate layers and enhanced surface area for joining. Alternatively, the casement layers 3 may be constructed from a rigid material such as stainless steel and bolted or clamped together. Incorporated within at least one or both of the substrate layers there are at least two ducts 6. These ducts are separated by a thin partition 90. The same ducts join a third duct the cross-sectional area of which is equal to the summed cross-sectional area of the two ducts 6. At a minimum distance 91 from the juncture of ducts 6 and 7 third duct 7 joins, axially, a fourth, segmented flow duct 10 that is of cross-sectional area and width at least 25% that of the third duct 10, and most preferably 50% of that of the third duct. The geometrical restriction 9 in the common duct 7 reduces the cross-sectional dimensions so that the laminar flow streams within the common duct convert to segmented flow 8 within the adjoining segmented flow duct 10. The fluid manipulation device or assembly incorporates one or more radio frequency transponders 11 embedded within its matrix or attached to the external surface. In FIGS. 1B-1E one or more openings 12 within the substrate layers may be provided and connected to the external environment with input and/or output ducts 13 for the transfer of fluids. In FIGS. 1C-1D a second fluoropolymer-based or -coated substrate is omitted and instead a fluoropolymer coating 14 is applied to the layer of casement material that lies in intimate juxtaposition with the first substrate layer. FIG. 1D shows a fluid manipulation device as in FIG. 1C but where a thin metallic film 15 is deposited on to the non-machined parts of the substrate layer and casement layer. This film may be caused to rise in temperature by inductive heating and weld the substrate layer to the casement material that lies in intimate juxtaposition with it. FIG. 1E shows a cut-away plan view of the fluid manipulation device showing features common to all variants of the fluid manipulation device, with the exception of optional input-output fluid communication ducts 13.

FIGS. 2A-2B show a fluid manipulation device similar to FIG. 1 but where no separate casement material is provided. A first fluoropolymer-based or -coated substrate 1 and a second fluoropolymer-based or -coated substrate 2 are held in intimate juxtaposition by means of thermocompressive welding or inductive heating of an optional metallic film 16 deposited on the non-duct surfaces, of at least one of the substrate layers, to at least 5° C. above the glass transition temperature of the fluoropolymer film or bulk material and subsequently cooled to ambient.

Figure 3B:
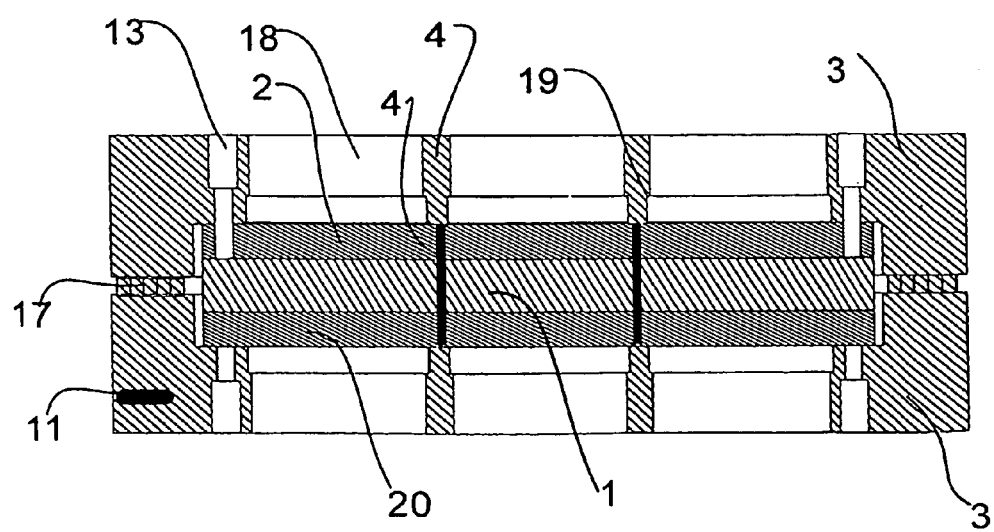

FIG. 3 shows a preferred embodiment of the device for the manipulation of fluids. Casement layers 3 are provided with peripheral inter-digitated, interlocking, concentric semi-circumferential fins 17 that enable the casement parts to join in a specific geometrical configuration, and allow for an enhanced mechanical binding between mating layers. Casement protrusions 4 reach through vias in the substrate layers and join corresponding protrusions from the opposed casement layer. The casement layers may be provided with one or more through-holes 18 which allow additional functionalities. The through-holes may provide visual access to the fluidic ducts in substrate layers 1 or 2 where the nearest substrate layer is configured to allow optical access, for example for a charged coupled device. The through-holes are provided with an annular recessed undercut 19, which can be used to retain additional substrate devices fitted with a corresponding peripheral rim. The device may be provided with one or more additional supporting layers 20 situated either side of the juxtaposed substrate layers 1, 2.

Figure 4A:
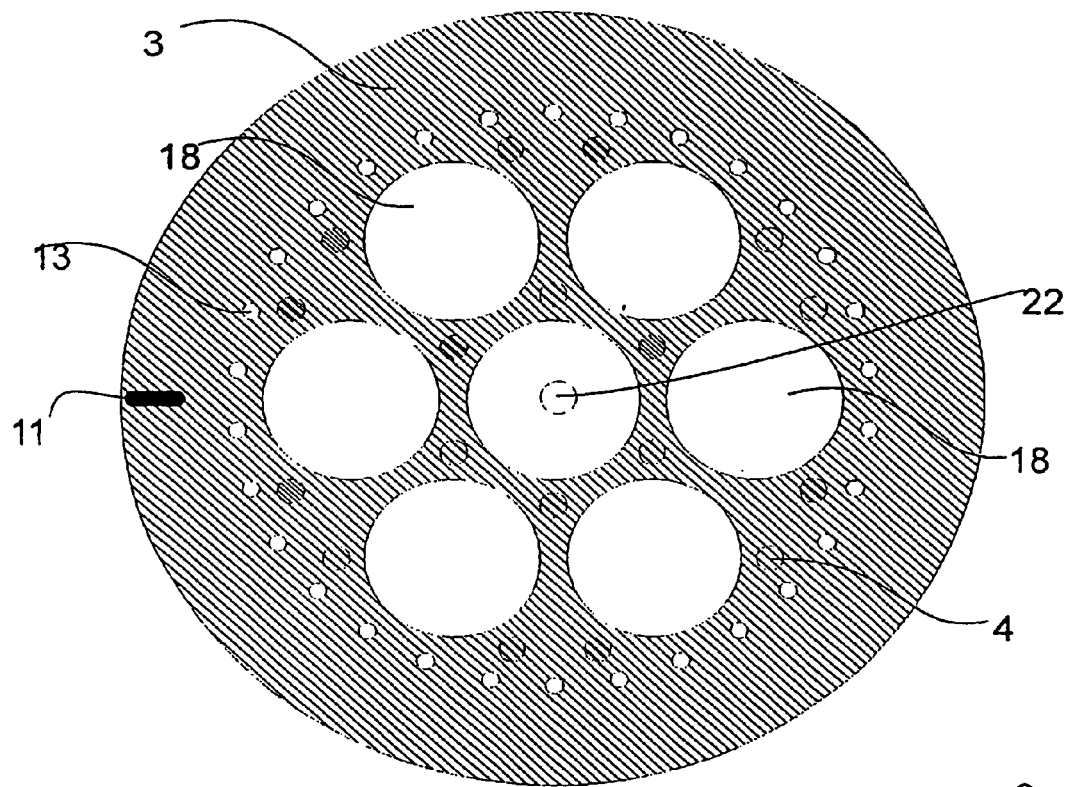
FIGS. 4A-4B are plan and sectional views of a fourth embodiment of fluid manipulation device.
Figure 4B:
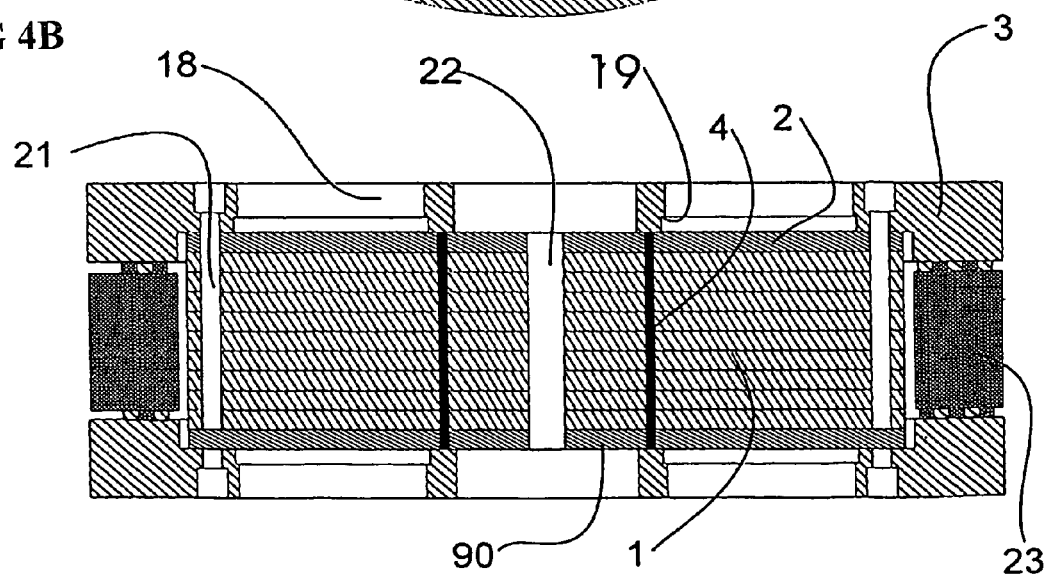

FIGS. 4A-4B show another preferred embodiment of the device for the manipulation of fluids. More than one substrate layers 1 are stacked on top of each other in an assembly. Substrate layers may have ducts machined in one side or both. Fluidic communication between layers may be provided by individual through-layer via holes translocating fluids from one layer to the next or any other. Equally, fluid communication to two or more layers may share a common opening for connection with the external environment which communicates to each layer through openings in each layer that are in turn aligned vertically through the stack of substrate layers as indicated in FIG. 4B. Such a vertical common duct 22 may act as an output drain for fluids emerging from one or more segmented flow ducts (not shown in FIG. 4 for clarity, but see 10 in FIG. 1) on two or more substrate layers. The assembly may accommodate a variable number of substrate layers by incorporating a casement layer spacer 23 which may be thermally joined or bolted to casement layers 3.

FIGS. 5A-5D show another preferred embodiment of the device for the manipulation of fluids. The Figure shows a device similar to that described in FIG. 4 but where the through-holes 18 in casement 3 incorporate one or more smaller substrate devices (called hereafter daughterboards 24 as described in more detail in FIG. 6) or multilayer daughterboards 35 of such. FIG. 5B shows side and plan views of a daughterboard showing the distal surface 36 with protrusions 27 and the proximal surface 37 with through vias 28. FIG. 5C shows a single layer daughterboard 24 and a multilayer daughterboard 35. The multilayer daughterboard may be formed from a daughterboard substrate with daughterboard interlayers 38 stacked on top of one another. The daughterboard interlayers may be provided with a range of through vias aligned with the substrate layer protrusion vias 28 for the passage of fluids between layers or additional through vias for further fluid communication between layers or alternate sides of given interlayers. A further daughterboard capping layer 39 may be provided which contains no through vias but may incorporate ducts for the passage of fluids. FIG. 5D shows a fluid handling device as described more fully in FIG. 4 but where the casement through holes have been occupied with an example daughterboard 24 and a daughterboard substrate assembly 35.

Figure 6:
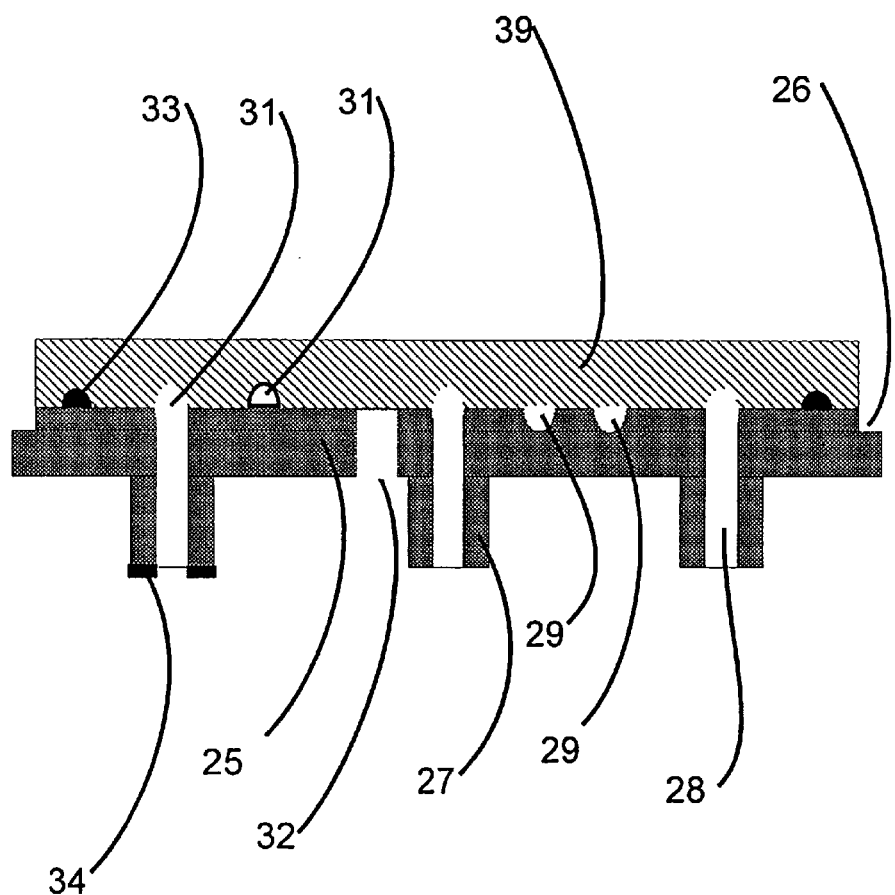
FIG. 6 is a side view of a daughterboard for fluid manipulation devices of the present invention.

FIG. 6 shows a preferred embodiment of the daughterboard. Each daughterboard comprises a substrate base 25 fitted with a recessed rim 26 so that it can be secured in place by the recessed undercut 19 in casement 3 through-holes 18 (see FIG. 3 for 3, 18, 19). A daughterboard may comprise one or more protrusions 27 from the base, in each of which protrusions a via 28 may be provided. The daughterboard substrate vias may function for the passage of fluids, or with appropriate coatings the guided passage of light through a liquid core within the via, or with appropriate metallic or conductive polymer coatings the communication of electrical power or data. The daughterboard may have machined within its proximal surface one or more ducts 29 for the passage of fluids. The daughterboard substrate may be bonded to another daughterboard capping layer 30 (called herein daughterboard capping layer) in which further ducts 31 may be provided for the passage of fluids. The daughterboard substrate layer may be provided with cavities 32 accessible from the distal side in which can be placed sensor and actuator components. The daughterboard substrate layer may be provided with an optional alignment ridge 33 that can mate with a corresponding groove (not shown for clarity) in the daughterboard capping layer. The daughterboard protrusions 27 may be provided with compressible fluoroelastomeric sealing rings 34 to help provide hermetic seals when interfaced with the fluid manipulation device.

Figure 7:
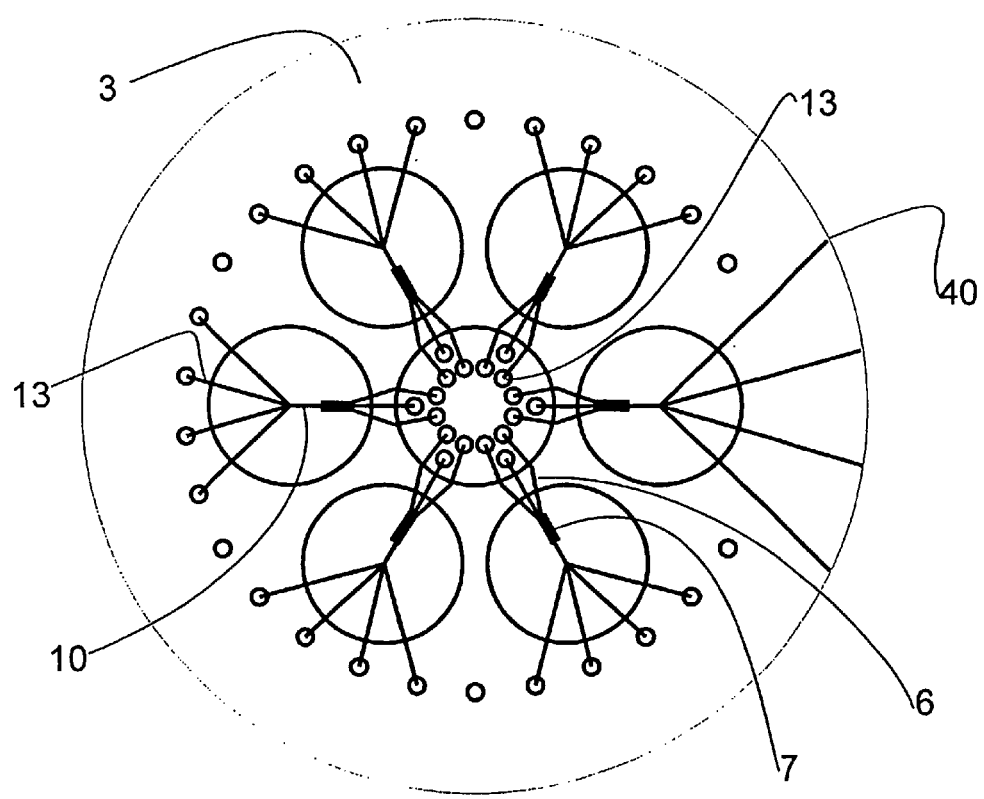
FIG. 7 is a plan view of a sixth embodiment of fluid manipulation device.

FIG. 7 shows another preferred embodiment of a fluid manipulation device. In this embodiment, fluid inputs are made from centralised fluid communication ports and segmented fluid flow through the network of ducts is caused by centrifugal means. Immiscible fluids are caused to move from an external source through fluid communication ducts 13 to and through the ducts 6 to a common duct 7 containing a geometrical restriction 9, or other device to cause segmentation of laminar fluid streams, and into the segmented flow duct 10. The segmented flow stream in duct 10 may be further divided into two or more segmented flow ducts which exit the fluid manipulation device directly from the substrate layer 3 through a peripheral exit port 40 located at the periphery of the device or through a duct 13 in casement 3 on either the proximal or distal surface. Two or more segmented flow ducts may merge into one common duct draining segmented flow streams from the device.

Figure 8A:
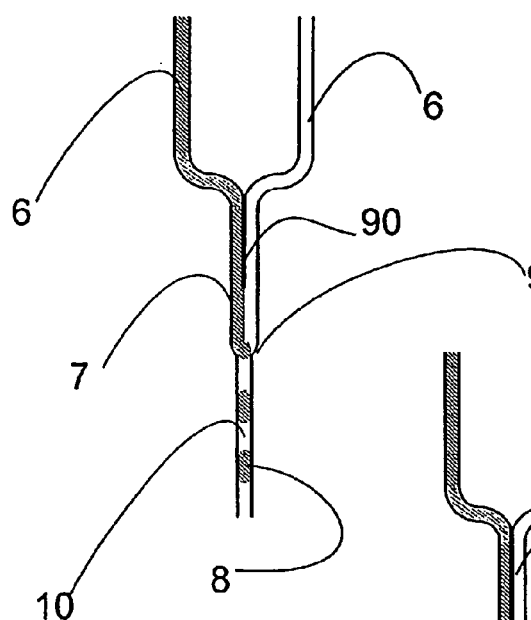
FIGS. 8A-8C show a seventh embodiment of fluid manipulation device.
Figure 8B:
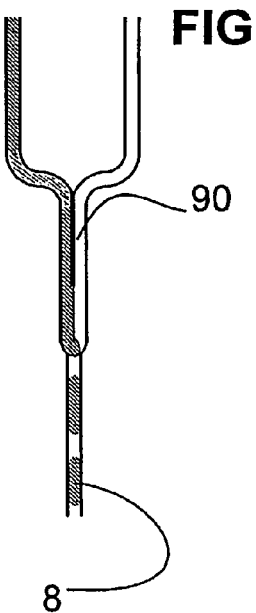
Figure 8C:
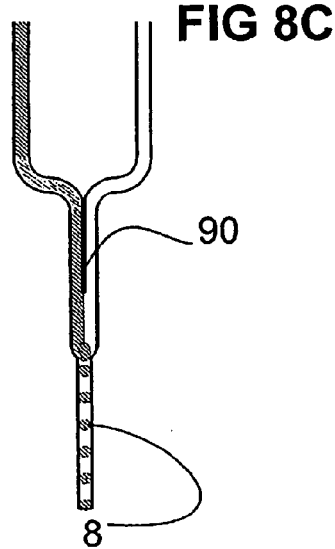

FIG. 8A shows two ducts 6 along which immiscible fluids are caused to move into a common duct 7 which incorporate a geometrical constriction 9 that converts laminar flow in common duct 7 to segmented flow 8 in segmented flow duct 10. The relative volumes of the immiscible phase liquid components present in the segmented flow stream may be controlled by the relative flow rates of the immiscible phase liquids. FIGS. 8B-8C show variants of FIG. 8A but where the relative proportions of the immiscible phase liquids in the segmented flow duct have been altered by the flow rates of the same liquid phase components through the input ducts 6. This enables liquids to, be eluted in the segmented flow duct(s) as serial aliquots of defined volume.

Figure 9A:
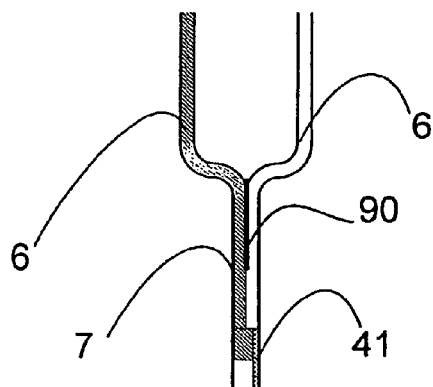
FIGS. 9A-9C show variants of the device of FIGS. 8A-8C.
Figure 9B:
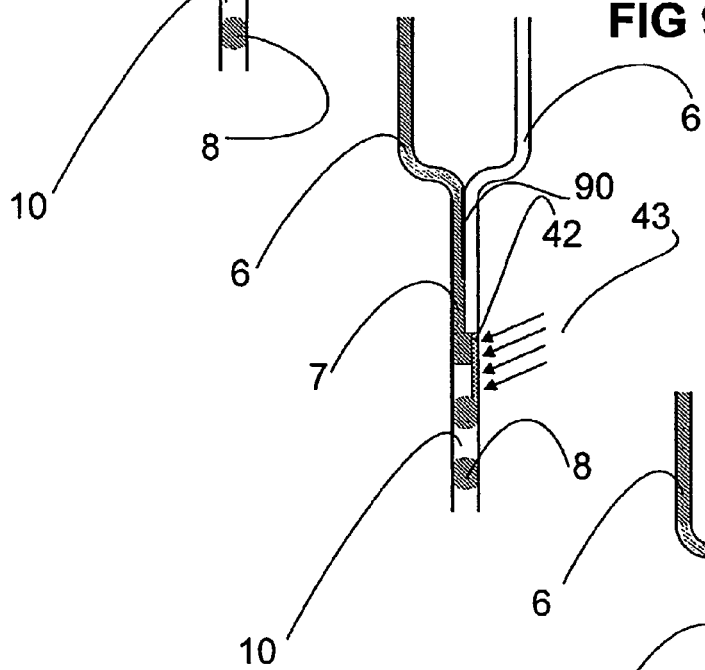
Figure 9C:
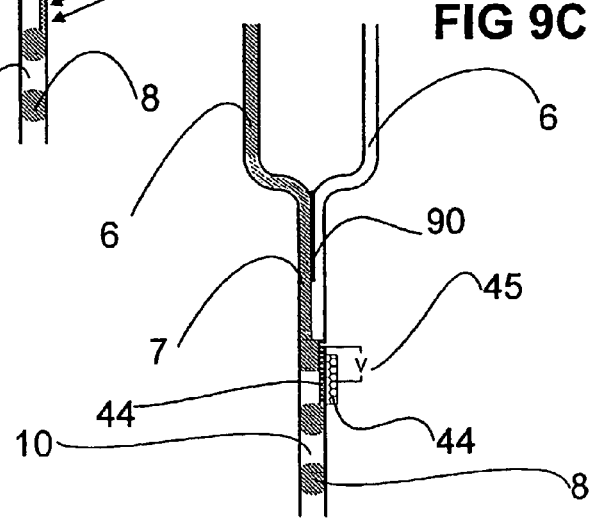

FIG. 9A shows two ducts 6 along which immiscible fluids are caused to move into a merged common duct 7 which incorporates a segment 41 provided with a change in surface energy that converts laminar flow in common duct 7 to segmented flow 8 in segmented flow duct 10. FIG. 9B shows two ducts 6 along which immiscible fluids are caused to move into a merged common duct 7 which incorporates a segment provided with a photo-responsive surface 42 in contact with the fluid and of which surface the contact angle varies upon illumination 43 so causing the laminar flow in common duct 7 to convert to segmented flow 8 in segmented flow duct 10. The effect of illumination is to cause a temporally defined and reversible photo-wetting effect. FIG. 9C shows two ducts 6 along which immiscible fluids are caused to move into a merged common duct 7 which incorporates a segment provided with two electrically conductive surfaces 44 separated by an insulator, which could be the wall of the duct or a thin interelectrode film, with one of the surfaces in contact with the liquids in common duct 7. Upon electrical polarisation with an applied voltage 45, the contact angle varies causing the laminar flow in common duct 7 to convert to segmented flow 8 in segmented flow duct 10. The effect of polarisation is to cause a temporally defined and reversible electro-wetting effect.

Figure 10A:
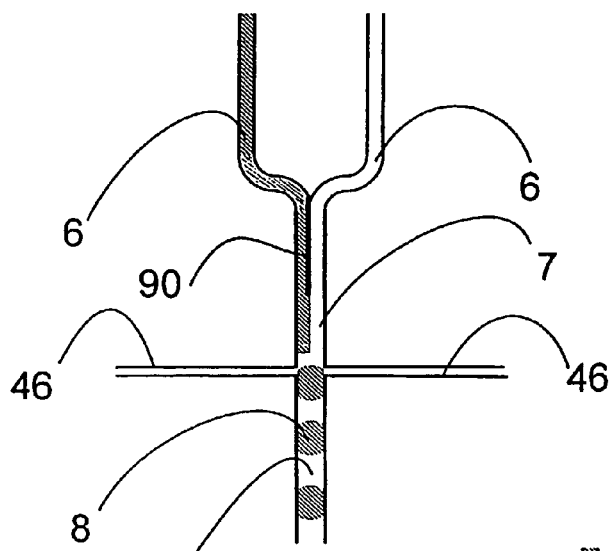
FIGS. 10A-10B show an eighth embodiment of fluid manipulation device.
Figure 10B:
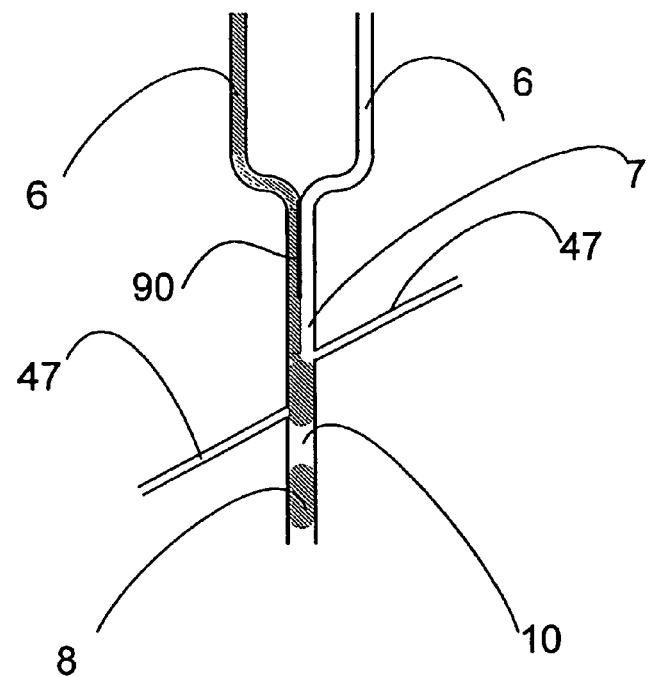

FIGS. 10A-10B show two ducts 6 along which immiscible fluids are caused to move into a merged common duct 7 which incorporates a cruciform junction 46 or staggered-T or staggered-side (shown in FIG. 10B) junction with other ducts 47 that function to provide electro-kinetic disruptions of the parallel fluid flow in common duct 7 causing the conversion to segmented flow 8 in duct 10. Electrical potentials are applied between the ducts 47 to cause electrokinetic flow across duct 7.

Figure 11A:
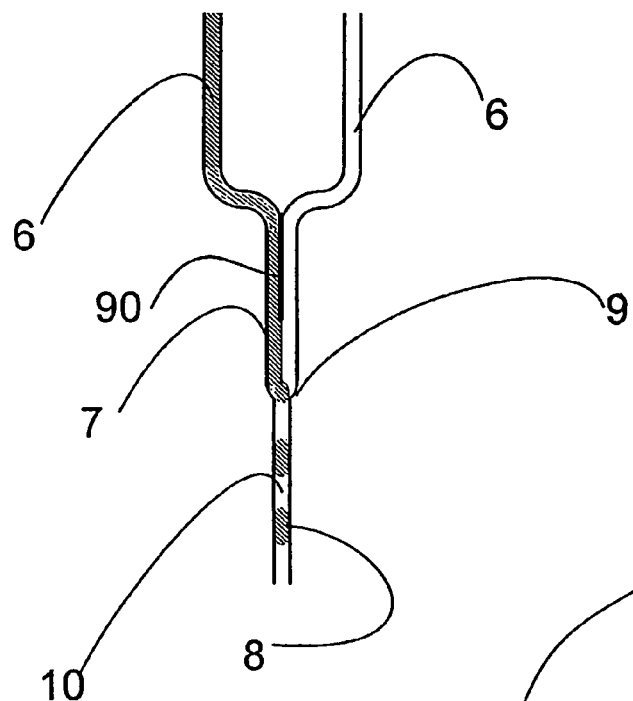
FIGS. 11A-11B show variants of a ninth embodiment of fluid manipulation device.
Figure 11B:
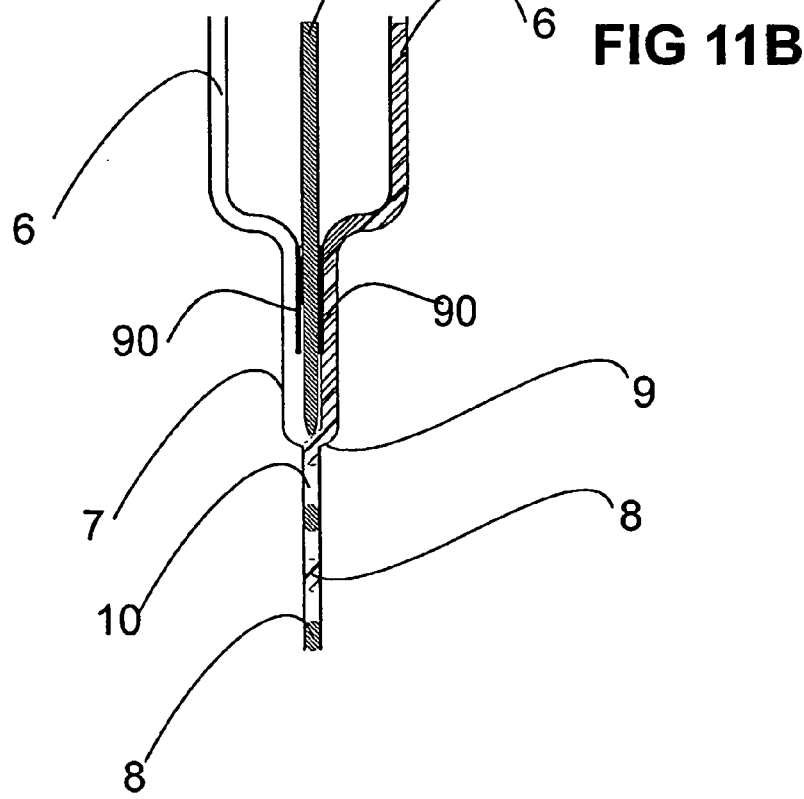

FIGS. 11A-11B show examples of a preferred fluid duct configuration for the fluid manipulation device where in FIG. 11A two ducts 6 merge to form a common duct 7, and where in FIG. 11B three ducts 6 merge to form a common duct 7. In both examples laminar flow predominates within common duct 7 until the point of geometrical constriction 9 is reached which causes laminar flow to convert to segmented flow 8 in segmented flow duct 10. It will be realised by those practised in the art, given the benefit of this disclosure, that more than three ducts may also be merged to form a common duct, so providing a means to produce streams of segmented fluids where even more than three immiscible phase components are present. In addition, a step-change in surface energy, photowetting, electrowetting and electrokinetic disruption of laminar immiscible phase flow (as shown in FIGS. 9A, 9B, 9C, 10A and 10B) may be employed to form segmented flow instead of constriction 9.

Figure 12:
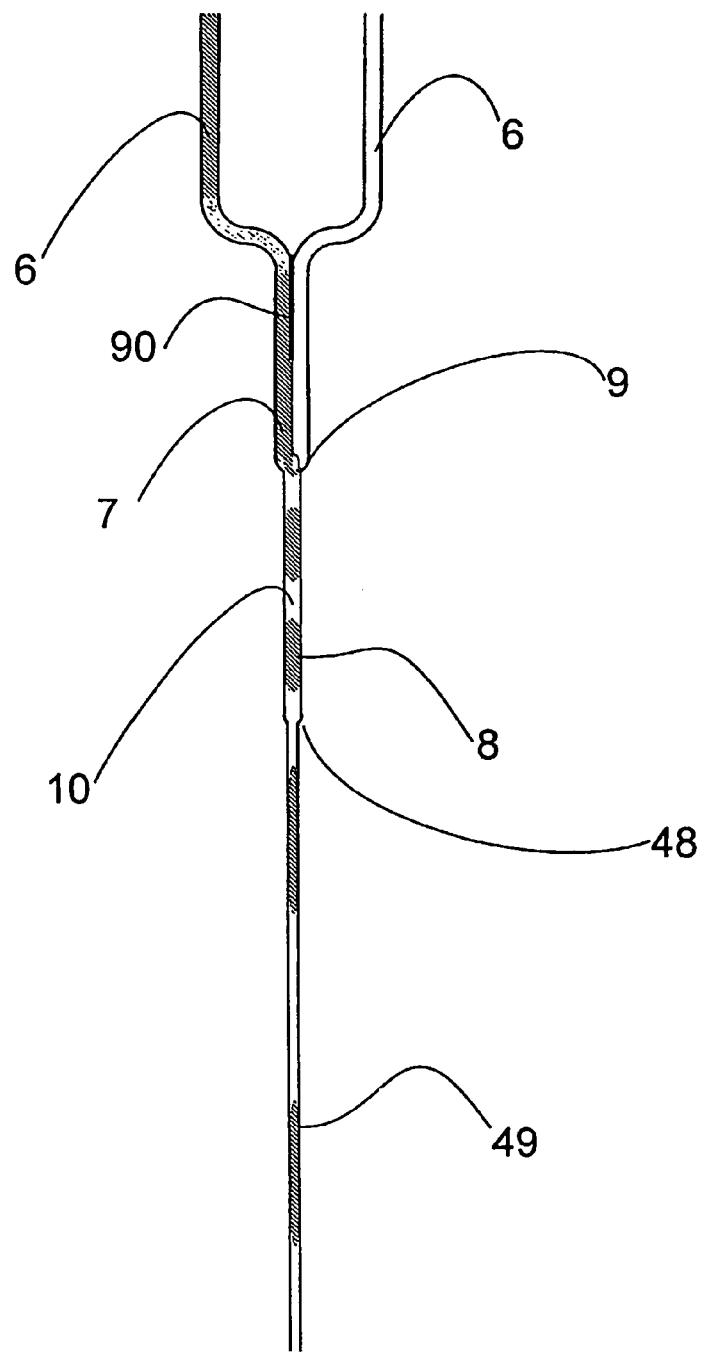
FIG. 12 shows a tenth embodiment of fluid manipulation device.

FIG. 12 shows a further example of another fluid duct configuration of the device for the manipulation of fluids as shown and described in FIGS. 8A-8C, but with the addition of another geometrical constriction 48 within the segmented flow duct 10. This has the effect to cause a change in two- and three-dimensional morphology of the fluid segments 8 as they pass through the constriction. This may convert, for example, ovoid fluid segments (as suggested in 8) to longer and thinner segments 49. The constriction 48 may be repeated in a serial manner, so incrementally altering the morphology of fluid segments.

Figure 13:
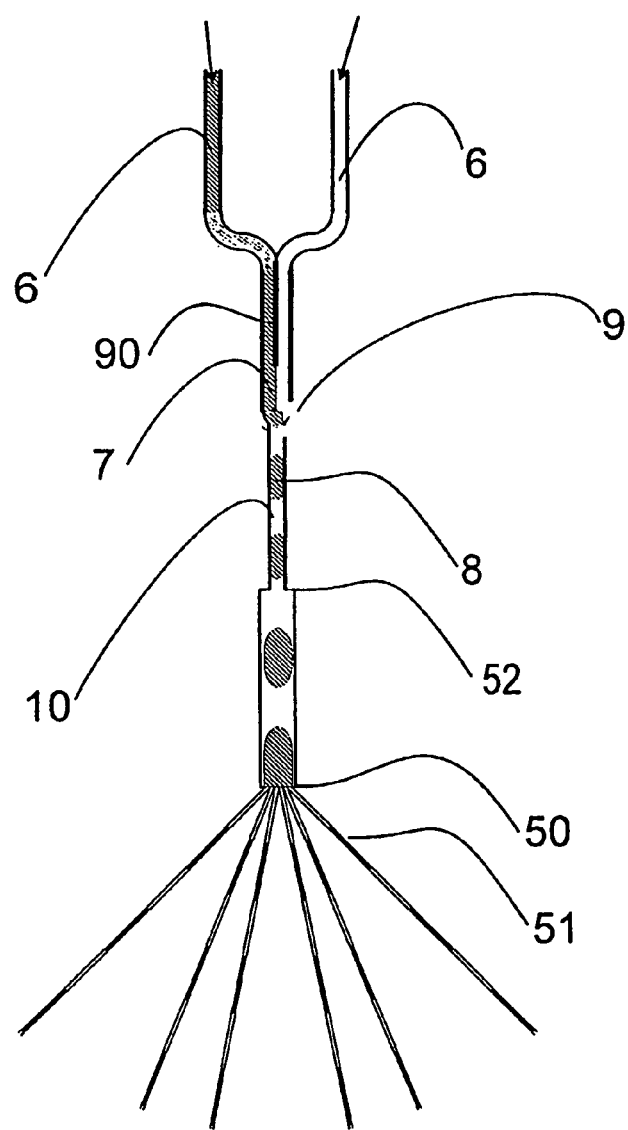
FIG. 13 shows an eleventh embodiment of fluid manipulation device.

FIG. 13 shows a further example of another fluid duct configuration of the device for the manipulation of fluids. Here segmented flow stream 8 is generated as in FIG. 1E but, equally, the same may be generated according to the duct configurations shown in FIGS. 9-11. The segmented flow duct splits at junction 50 into two or more smaller ducts 51, narrower in width, depth, both or diameter, causing the fluid segments to divide into smaller segments in each of the provided ducts 51. Optionally, the segmented flow duct 10 may be widened, as shown at 52, prior to splitting into the two or more smaller ducts, allowing for fluid segments to assume a morphology more conducive to splitting at the junction 50.

Figure 14:
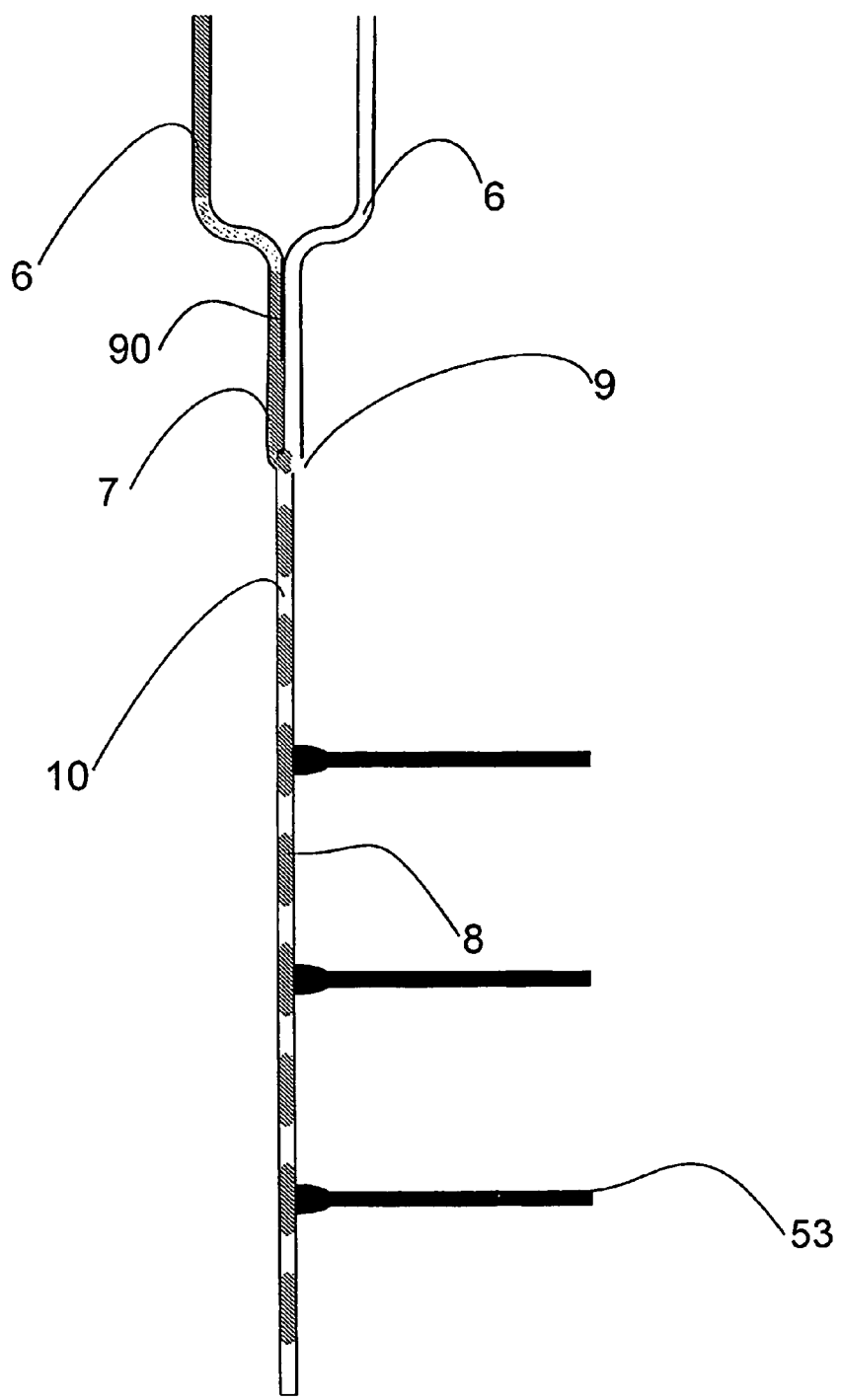
FIG. 14 shows a twelfth embodiment of fluid manipulation device.

FIG. 14 shows a further example of another fluid duct configuration of the device for the manipulation of fluids. Here segmented flow stream 8 is generated as in FIG. 1E but, equally, the same may be generated according to the duct configurations shown in FIGS. 9-13. The segmented flow duct 10 is joined by one or more tributary ducts 53 at right angles or any other angle allowing for additional liquids to pass into the segmented flow duct. This feature facilitates the sequential exposure of fluid segments to further liquids as they are caused to move along the segmented flow duct.

Figure 15A:
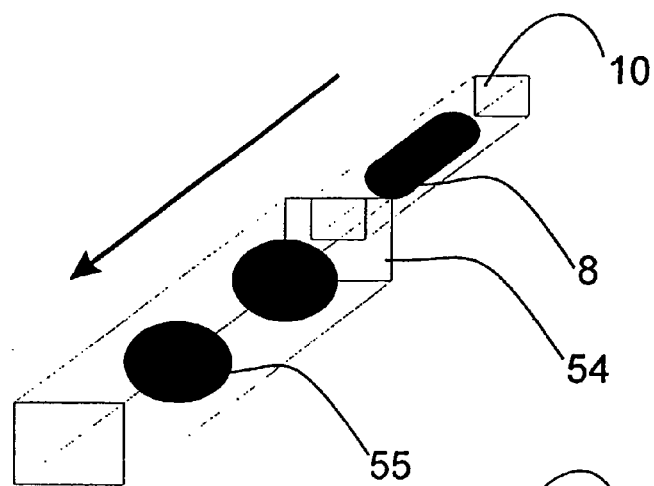
FIGS. 15A-15C show a thirteenth embodiment of fluid manipulation device.

FIG. 15 shows a further example of another fluid duct configuration of the device for the manipulation of fluids. In FIG. 15A fluid segments 8 are caused to flow in segmented flow duct 10. Segmented fluids may then be caused to flow into an expansion duct 54 where the internal dimensions are expanded such that fluid segments, previously of a non-spherical morphology (as indicated in 8), assume a spherical geometry 55 where the periphery of the spherical segments no longer makes physical contact with the internal walls of the duct. By this means sequences of spherical droplets are formed.

Figure 15B:
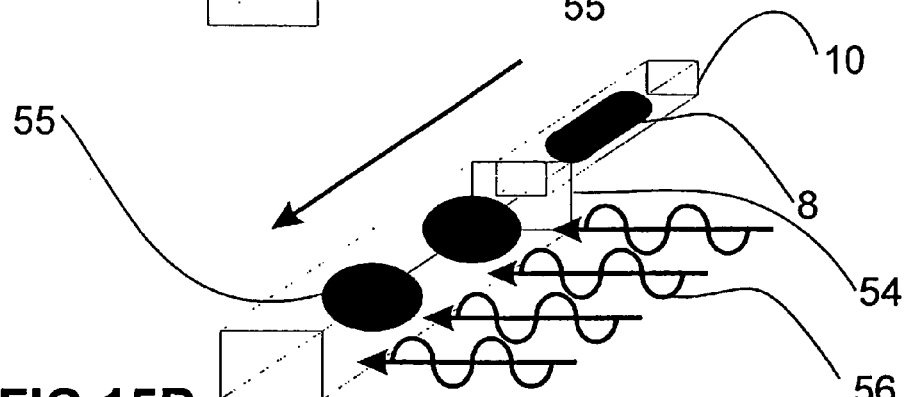
Figure 15C:
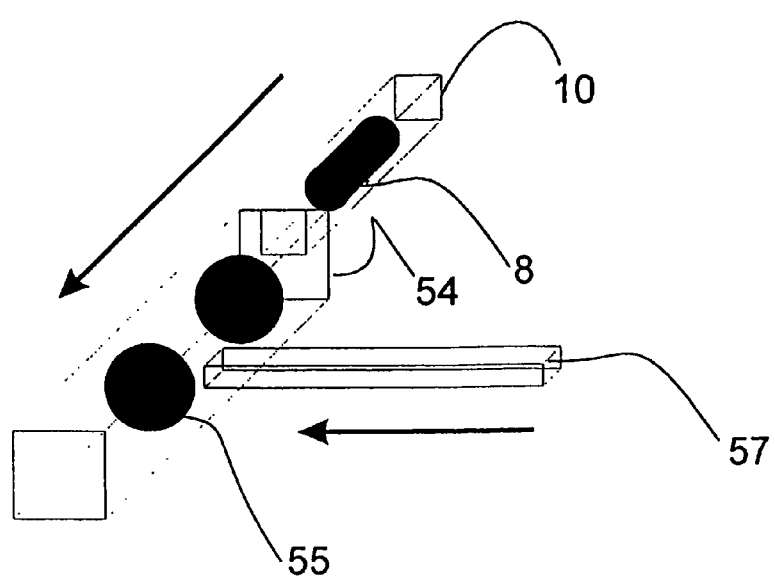

It will be understood by those practiced in the art, given the benefit of this disclosure, that sequences of near-identical spheres can be created, or alternatively sequences of custom size spheres, by altering the relative flow rates of the immiscible phase fluids caused to flow into the common duct. FIG. 15B shows a similar example where the bulk material or outer layer(s) of the spheres thus created may be cross-linked or polymerised by exposure to electromagnetic radiation 56, such as ultraviolet light. FIG. 15C shows another similar example where the bulk material or outer layer(s) of the spheres thus created may be caused to solidify, gel, freeze, polymerise, crosslink or otherwise to assume a less than completely liquid state by exposure to additional reagents fed from a tributary duct 57. Equally, the spheres may remain in a liquid form but become exposed to or enveloped by other compounds provided by the liquid added through the tributary duct. It will be recognised by those skilled in the art, given the benefit of this disclosure, that more than one tributary duct may be provided in a serial succession thus enabling the opportunity to make sequential exposures to more than one additional reagent as may be required in a particular chemical reaction, or required for the provision of layered coatings around each sphere. Linear arrows denote direction of fluid movement. Waved arrows denote direction of exposure of electromagnetic radiation.

Figure 16A:
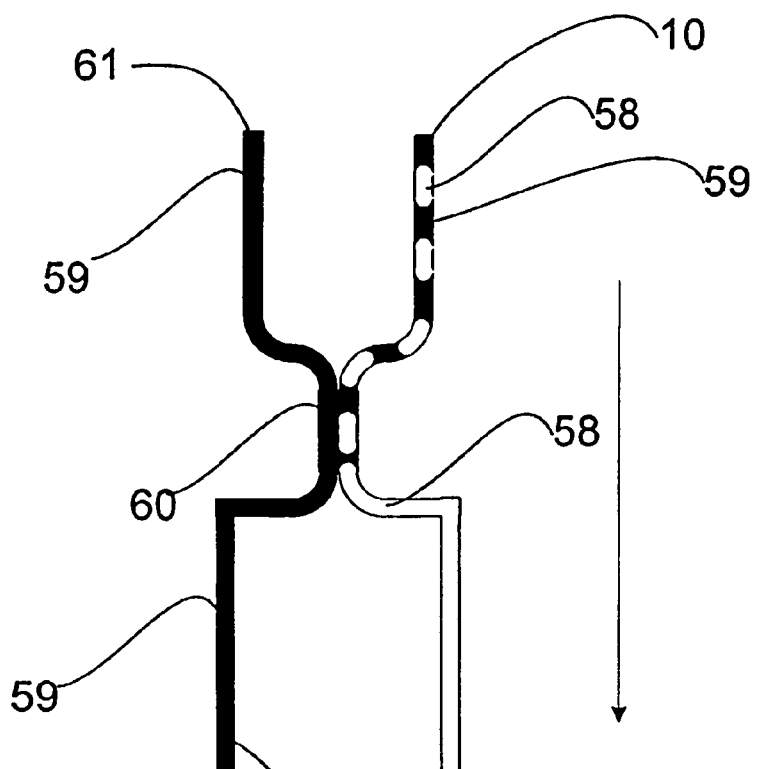
FIGS. 16A-16B show a fourteenth embodiment of fluid manipulation device.
Figure 16B:
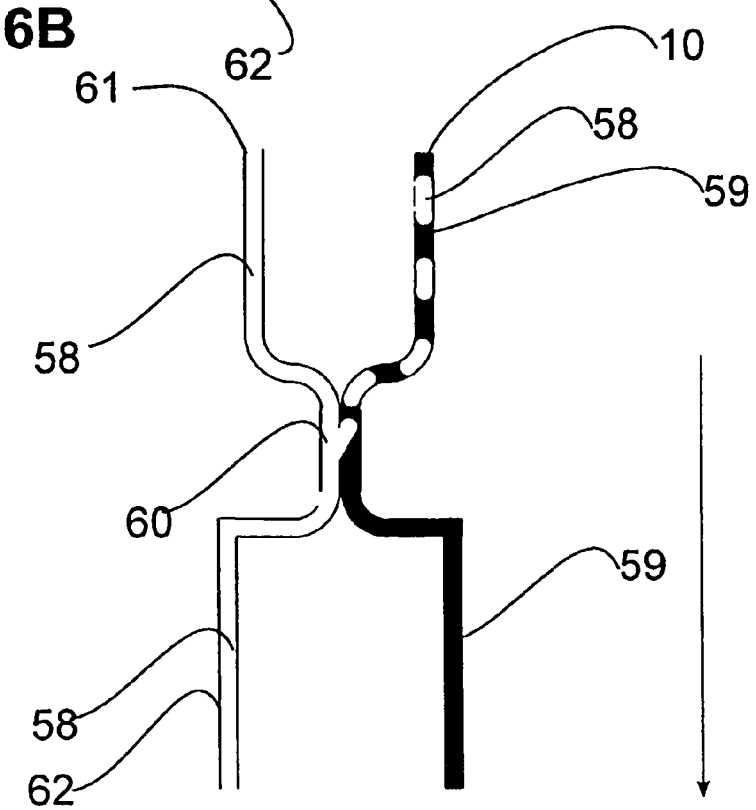

FIG. 16 shows a further example of another fluid duct configuration of the device for the manipulation of fluids. The segmented flow duct 10 may be provided with a tributary duct 61 that makes parallel contact over a short geometrical section 60 such that the fluids in both ducts flow in parallel in a shared duct for a short duration. In FIG. 16A a contactor duct contains an aqueous liquid phase 59 (shaded black). At the merger of the two ducts the aqueous component 59 of the segmented fluid in the segmented fluid duct 10 is attracted to the aqueous fluid 59 in the contactor duct and flows out through the continuation 62 of contactor duct with the rest of the aqueous fluid. The segmented fluid is thereby reduced to a singular stream of the other non-aqueous phase. In FIG. 16B the reverse is demonstrated whereby at the merger of the two ducts the non-aqueous component 58 of the segmented fluid in the segmented fluid duct is attracted to the non-aqueous fluid 58 in the contactor duct 61 and flows out with the rest of the non-aqueous fluid through continuation 62 of the contactor duct. The segmented fluid is thereby reduced to a singular stream of the aqueous phase. The configuration of fluid ducts provides a means of reverting the segmented flow stream back to the original separate phase components.

Figure 17:
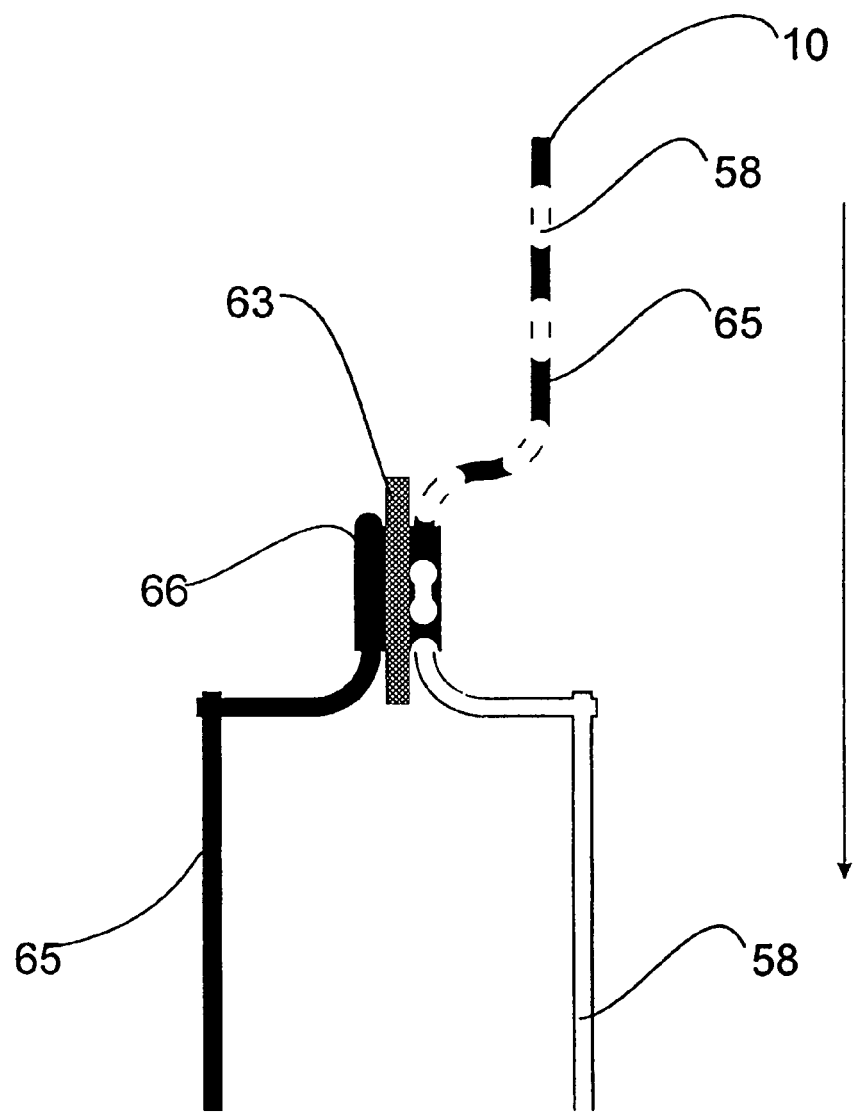
FIG. 17 shows a fifteenth embodiment of fluid manipulation device.

FIG. 17 shows a further example of another fluid duct configuration of the device for the manipulation of fluids. The gas-liquid phase segmented flow in duct 10 may be interfaced with another duct 66 but separated at the juncture by a gas permeable material 63 such as a membrane. The gas phase component 65 (shaded black) of the segmented flow stream in duct 10 rapidly diffuses across membrane 63 and escapes through duct 65. This causes the segmented flow in duct 10 to revert to a continuous stream of liquid phase component in continuation of fluid duct 10 beyond the interface with duct 66.

Figure 18:
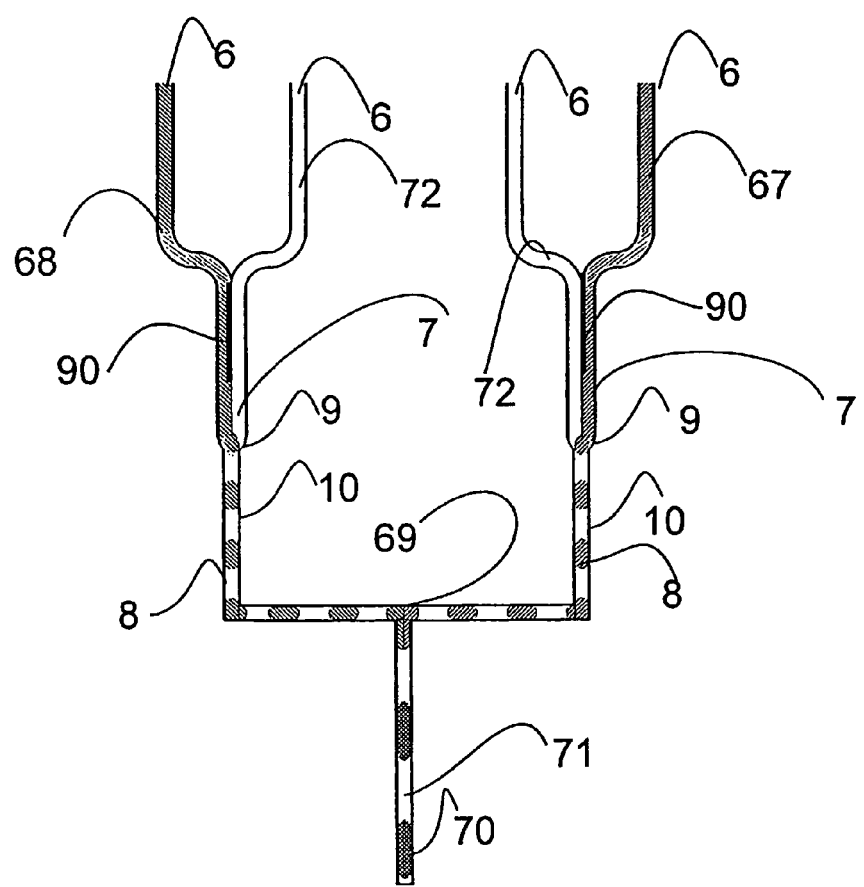
FIG. 18 shows a sixteenth embodiment of fluid manipulation device.

FIG. 18 shows a further example of another fluid duct configuration of the device for the manipulation of fluids. The device shown is configured such that two separate aqueous fluid streams 67, 68 are caused to segment with an immiscible fluid phase 72 at a constriction junction within separate common ducts 7. The two separate segmented flow streams 8 are caused to move along separate segmented flow ducts 10 and which meet at junction 69. The segmented flow streams are appropriately synchronised by means of pumping systems applied to cause the aqueous segments to meet and merge at the junction 69, to form larger aqueous segments 70 separated by the immiscible phase components which also merge to form larger segments 71. The rapid internal circulation vortex flow within the fluid segments 70 and 71 cause very rapid mixing. The aqueous segments or other immiscible phase components may comprise similar solutions incorporating dissolved or suspended compounds/components of similar or dissimilar concentrations. By the means of controlled volume elution and rapid micromixing achieved with the device configuration, a wide range of the dilution and/or mixing protocol may be achieved. The Figure shown illustrates the device where two segmented flow streams are merged, but others with more than 2 segmented flow streams may be constructed.

Figure 19:
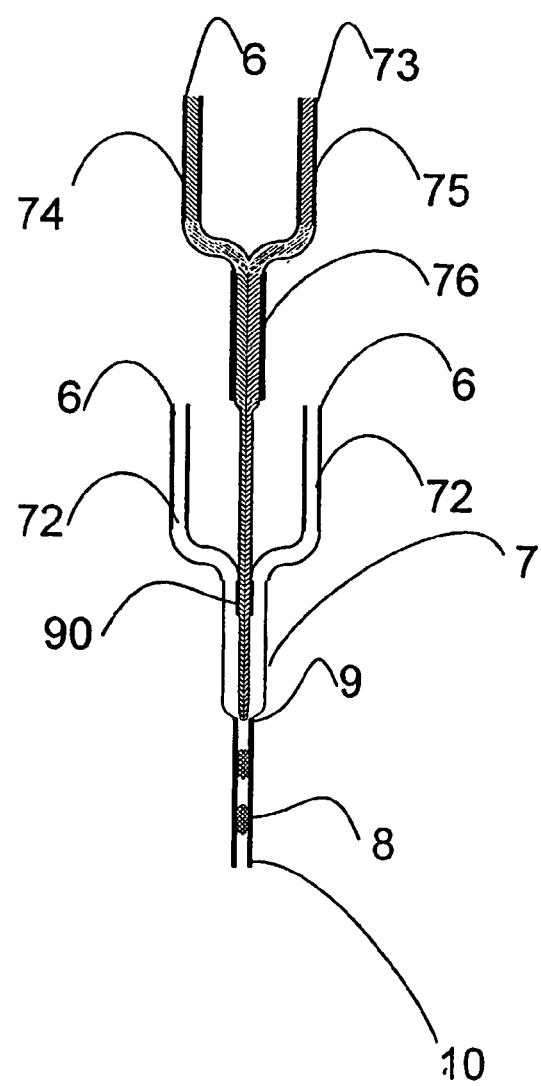
FIG. 19 shows a seventeenth embodiment of fluid manipulation device.

FIG. 19 shows a further example of another fluid duct configuration of the device for the manipulation of fluids. Ducts 6 provide immiscible fluids which merge as parallel flow in common duct 7 before forming segmented flow 8 in segmented flow duct 10 after constriction 9. One of the ducts 6 is joined by another duct 73 which feeds an additional stream of the same liquid phase component. In the example shown, two fluid streams 74 and 75 of the same phase merge and form parallel flow in the merged duct 76. The output from the merged duct 76 in turn merges with two more ducts 6 containing immiscible phase 72 to form a common duct 7. The constriction 9 in the common duct 7 causes the laminar flow of fluids 74, 75 and 72 to reform as segmented flow 8 in segmented flow duct 10. This geometrical configuration provides a means for the precision controlled elution and mixing of similar or dissimilar fluid streams, and is readily controllable over a wide range of flow rate conditions.

Figure 20A:
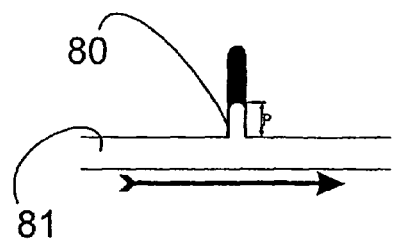
FIGS. 20A-20D show variants of an eighteenth embodiment of fluid manipulation device.
Figure 20B:
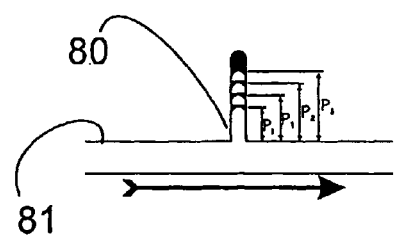
Figure 20C:
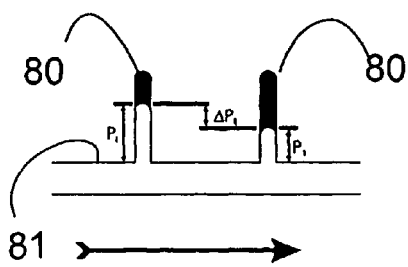
Figure 20D:
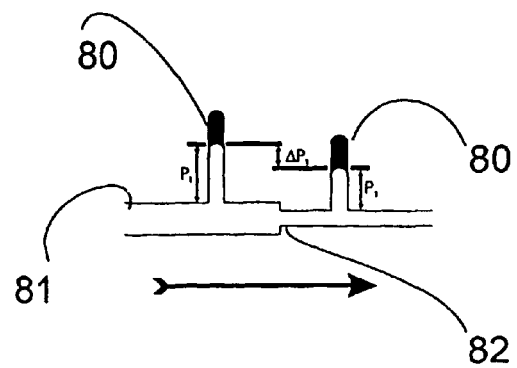

FIGS. 20A-20D show a further example of another fluid duct configuration of the device for the manipulation of fluids. The device is provided with one or more pressure sensors in the form of capillary gas-filled manometers. These are constructed as blind tributary ducts 80 arranged at any angle between 0° and 180° to the first microfluidic duct 81 along which fluids are caused to move. The first microfluidic duct may be any duct formed on the device for manipulation of fluids where there is non-segmented flow. The tributary ducts are preferably filled with inert gas such as argon or helium. Fluid within the first fluidic duct will rise into the tributary duct according to the prevailing pressure conditions. The tributary ducts function according to the principle that a change in gas volume provides a change in fluid pressure, i.e. an increase in fluidic pressure gives a decrease in gas volume. Therefore, by knowing the cross sectional area and length of the blind tributary ducts, the initial volume can be calculated and with the displacement of the fluid in the channel, the increase/decrease of the pressure-affected volume can be calculated. With liquid in the first microfluidic duct 80, the liquid level within the tributary duct 80 rises to an initial pressure setting Pi. According to pressure changes (for example, during fluid movement caused by the application of pressure) the pressure of the fluid increases and the fluid moves further up the tributary duct changing the volume of the trapped gas, thus giving P1, P2, P3 pressure readings (FIG. 20B). Other geometrical arrangements of more than one tributary duct 80 can provide information on fluid flow rate by indicating the pressure drop over predetermined length (FIG. 20C) or over a fluid resistor caused by a constriction 82 in the first fluid duct (FIG. 20D). The capillary manometers may be provided in a linear, serpentined, curved or coiled format and meniscus movements visualised by an optical device such as a charged coupled device. Arrows denote direction of fluid flow.

In any of the segment-generating devices in accordance with the invention, the inlet or supply passages for the respective fluids may be devoid of functionally operative input ports and so act as closed reservoirs (although these passages may have input ports which are used during manufacture and then sealed). Thus, the fluids are stored until caused to flow along their respective passages and combine to form a segmented flow: the segmented flow may pass out of the device through an output port, either to waste or to another device, or may pass to a reservoir in the same device.

The invention claimed is:

1. A device comprising first and second inlet passages for respective immiscible fluids, the first and second inlet passages merging into a third passage, wherein the device is operable to cause the two fluids to flow along the third passage in intimate contact with each other under parallel laminar flow conditions, the third passage being formed with a constriction or other discontinuity operable to cause the two fluids to form into a flow of alternate segments.

2. A device as claimed in claim 1, in which downstream portions of the inlet passages extend parallel with each other before merging to form the third passage.

3. A device as claimed in claim 1, in which said other discontinuity in the third passage comprises a region of changed surface energy.

4. A device as claimed in claim 1, in which said other discontinuity comprises a region of altered or alterable contact angle.

5. A device as claimed in claim 1, in which said other discontinuity comprises one or more further passages joining the third passage.

6. A device as claimed in claim 1, comprising a further inlet passage for a third fluid, the further inlet passage merging into the third passage upstream of the constriction or other discontinuity.

7. A device as claimed in claim 1, in which the third or outlet passage is formed with a second constriction or other discontinuity downstream of the first constriction or other discontinuity.

8. A device as claimed in claim 1, wherein the surfaces of the third passage which, in use, are in contact with said fluids comprise a fluoropolymer.

9. A device as claimed in claim 1, further comprising a source of electromagnetic radiation for polymerising or cross-linking the content (or part) of liquid segments produced downstream of the constriction or other discontinuity.

10. A device as claimed in claim 1 wherein the third passage is provided with an enlargement in cross-section downstream of the constriction or other discontinuity.

11. A method of producing a segmented flow of first and second immiscible fluids comprising:
(i) providing a device with a first conduit provided with a constriction or other discontinuity (ii) causing the first and second immiscible fluids to flow under parallel laminar flow conditions along said first conduit, wherein the constriction or other discontinuity causes the first and second immiscible fluids to form into a flow of alternate segments downstream of the constriction or other discontinuity, wherein the device is provided with first and second inlet passages for the delivery of the first and second immiscible fluids respectively to the first conduit and wherein the device comprises two substrates disposed face-to-face, the surface of at least one of the substrates being profiled such that the first and second inlet passages are defined between the two substrates, wherein the substrates are encased within two or more casement layers, the substrates being disposed within a cavity formed by the casement layers.

12. A method as claimed in claim 11 wherein the first and second inlet passages merge into the first conduit.

13. A method as claimed in claim 11 wherein the first and second inlet passages merge into the first conduit and downstream portions of the first and second inlet passages extend parallel with each other before merging to form the first conduit.

14. A method according to claim 11 wherein the surface of said first conduit in contact with said first and second immiscible fluids comprises a fluoropolymer.

15. A method according to claim 11 wherein the flow rates of the first and second immiscible fluids in the first conduit are mutually different.

16. A method according to claim 11 wherein the first and second immiscible fluids are exposed to ultra-violet radiation downstream of the constriction or other discontinuity.

17. A method according to claim 11 wherein the contents (or part) of liquid segments are polymerised or cross-linked by exposure to electromagnetic radiation.

18. A method as claimed in claim 11 comprising causing segments of at least one of the first and second fluids to form a substantially spherical shape.

19. A method according to claim 11 wherein the device comprises two substrates disposed face-to-face, the surface of at least one of the substrates being profiled such that the first and second inlet passages are defined between the two substrates, wherein the substrates are encased within two or more casement layers.

20. A fluid manipulation device comprising first and second ducts for the passage of respective immiscible fluids, each of said first and second ducts having a respective inlet for the introduction of said respective fluid into said device, wherein said first and second ducts join to form a third duct, wherein the device is operable to cause the first and second fluids to flow under parallel laminar flow conditions, the third duct being formed with a constriction, the constriction operable to cause the first and second fluids to form into a flow of alternate segments, wherein the device comprises two substrates disposed face-to-face, the surface of at least one of the substrates being profiled such that the first, second and third ducts are defined between the two substrates, the surfaces of the third duct that comes into contact with one or both of the first or second fluid adapted to include a fluoropolymer, the substrates being encased within two or more casement layers, and the substrates being disposed within a cavity formed by the casement layers.

21. A fluid manipulation device according to claim 20 wherein the surfaces of the first and second ducts that, in use, are in contact with the respective first and second fluids comprise a fluoropolymer.

22. A fluid manipulation device according to claim 20 wherein the two substrates are held together by outer members.

23. A fluid manipulation device according to claim 20 wherein the substrates are disposed within a cavity formed by the casement layers and the depth of the cavity is less than the combined thickness of the two substrates.

24. A fluid manipulation device according to claim 20 wherein the casement layers are provided with interlocking configurations for aligning the casement layers relative to one another.

25. A fluid manipulation device according to claim 20 wherein an input duct is provided in a casement layer and an output duct is provided in a casement layer, the input duct being in fluid communication with the first or second duct for transfer of fluid to the first or second duct and the output being in fluid communication with the third duct for transfer of fluid from the third duct to the output duct.

26. A fluid manipulation device comprising first and second ducts for the passage of respective immiscible fluids, each of said first and second ducts having a respective inlet for the introduction of said respective fluid into said device, wherein said first and second ducts join to form a third duct, wherein the device is operable to cause the first and second fluids to flow under parallel laminar flow conditions, the third duct being formed with a constriction, the constriction operable to cause the first and second fluids to form into a flow of alternate segments, wherein the device comprises two substrates disposed face-to-face, the surface of at least one of the substrates being profiled such that the first, second and third ducts are defined between the two substrates, the surfaces of the third duct that comes into contact with one or both of the first or second fluid adapted to include a fluoropolymer; immediately upstream of the third duct, the first and second duct extend parallel with each other.

* * * * *